(12) United States Patent
Tamura et al.

(10) Patent No.: US 7,887,940 B2
(45) Date of Patent: Feb. 15, 2011

(54) ELECTROLYTE MEMBRANE, ELECTRODE, AND FUEL CELL

(75) Inventors: Jun Tamura, Yokohama (JP); Yoshihiko Nakano, Yokohama (JP); Hideo Oota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1154 days.

(21) Appl. No.: 11/389,088

(22) Filed: Mar. 27, 2006

(65) Prior Publication Data

US 2007/0134533 A1  Jun. 14, 2007

(30) Foreign Application Priority Data

Dec. 13, 2005 (JP) .............................. 2005-359300

(51) Int. Cl.
*H01M 8/10* (2006.01)
(52) U.S. Cl. ................. 429/33; 252/62.2; 429/42; 429/44
(58) Field of Classification Search ................. 429/33, 429/42, 44; 252/62.2
See application file for complete search history.

(56) References Cited

U.S. PATENT DOCUMENTS

| | | | |
|---|---|---|---|
| 3,607,424 | A | 9/1971 | Maki et al. |
| 5,236,692 | A | 8/1993 | Nagashima et al. |
| 5,618,974 | A | 4/1997 | Kurimoto et al. |
| 5,635,041 | A | 6/1997 | Bahar et al. |
| 6,059,943 | A | 5/2000 | Murphy et al. |
| 6,127,432 | A | 10/2000 | Wegman et al. |
| 6,284,213 | B1 | 9/2001 | Paparatto et al. |
| 6,638,659 | B1 | 10/2003 | Fenton et al. |
| 2004/0038105 | A1 | 2/2004 | Hennige et al. |
| 2004/0040862 | A1 | 3/2004 | Kosek et al. |
| 2004/0048130 | A1 | 3/2004 | Yoshikawa et al. |
| 2004/0072061 | A1 | 4/2004 | Nakano et al. |
| 2004/0188248 | A1 | 9/2004 | Sawa |
| 2004/0245668 | A1 | 12/2004 | Gough et al. |
| 2006/0019148 | A1 | 1/2006 | Tamura et al. |
| 2006/0078765 | A1 | 4/2006 | Yang et al. |
| 2007/0082257 | A1 | 4/2007 | Tamura et al. |
| 2007/0181418 | A1 | 8/2007 | Hasegawa et al. |

FOREIGN PATENT DOCUMENTS

| | | | |
|---|---|---|---|
| JP | 2002-216537 | * | 8/2002 |
| JP | 2003-142124 | | 5/2003 |
| JP | 2004-103299 | | 4/2004 |

(Continued)

OTHER PUBLICATIONS

U.S. Appl. No. 11/537,219, filed Sep. 29, 2006, Tamura, et al.

(Continued)

*Primary Examiner*—Peter D. Mulcahy
*Assistant Examiner*—Henry Hu
(74) *Attorney, Agent, or Firm*—Oblon, Spivak, McClelland, Maier & Neustadt, L.L.P.

(57) ABSTRACT

A proton conductive inorganic material includes oxide particles containing at least one element X selected from the group consisting of W, Mo, Cr, B and V, an oxide carrier carrying the oxide particles and containing at least one element Y selected from the group consisting of Sn, Hf, Ge, Ga, In, Ce and Nb.

26 Claims, 2 Drawing Sheets

FOREIGN PATENT DOCUMENTS

| | | |
|---|---|---|
| JP | 2004-515351 | 5/2004 |
| JP | 2004158261 | 6/2004 |
| JP | 2004-296243 * | 10/2004 |
| JP | 2005-71756 | 3/2005 |
| JP | 20051143555 | 4/2005 |
| JP | 2005-285413 | 10/2005 |
| JP | 2005-332800 | 12/2005 |
| JP | 2006134603 | 5/2006 |
| KR | 2003-0032321 | 4/2003 |
| KR | 10-2005-56892 | 6/2005 |
| WO | WO 02/47802 A1 | 6/2002 |
| WO | WO 03/081691 A2 | 10/2003 |

OTHER PUBLICATIONS

U.S. Appl. No. 12/050,397, filed Mar. 18, 2008, Nakano, et al.
U.S. Appl. No. 11/744,267, filed May 4, 2007, Tamura, et al.
U.S. Appl. No. 12/372,135, filed Feb. 17, 2009, Tamura, et al.
U.S. Appl. No. 11/778,937, filed Jul. 17, 2007, Tamura, et al.
Machine Translation and Abstract in English of JP 2004158261.
Machine Translation and Abstract in English of JP 2006134603.

* cited by examiner

ELECTROLYTE MEMBRANE, ELECTRODE, AND FUEL CELL

CROSS-REFERENCE TO RELATED APPLICATIONS

This application is based upon and claims the benefit of priority from prior Japanese Patent Application No. 2005-359300, filed Dec. 13, 2005, the entire contents of which are incorporated herein by reference.

BACKGROUND OF THE INVENTION

1. Field of the Invention

The present invention relates to a proton conductive inorganic material suitable for forming a fuel cell member such as an electrode for a fuel cell and an electrolyte membrane for a fuel cell, as well as to an electrolyte membrane, an electrode, a membrane electrode assembly and a fuel cell using the proton conductive inorganic material.

2. Description of the Related Art

Much research is presently being conducted on a proton conductive solid electrolyte for applying the proton conductive solid electrolyte to an electrochromic material or a sensor, and particularly, to a fuel cell having a high energy density that is operated under low temperatures.

A fuel cell comprises a proton conductive electrolyte membrane, a fuel electrode, which is also called an anode and mounted to one surface of the proton conductive electrolyte membrane, and an oxidizing agent electrode, which is also called a cathode and mounted to the other surface of the proton conductive electrolyte membrane. A fuel such as hydrogen or methanol is supplied to the fuel electrode. On the other hand, an oxidizing agent is supplied to the oxidizing agent electrode. The fuel is electrochemically oxidized in the anode so as to form protons and electrons. The protons thus generated in the anode are transmitted through the proton conductive electrolyte membrane so as to reach the cathode. As a result, water is formed in the cathode by the reactions carried out among the proton, the oxidizing agent and the electron supplied from an external circuit. Electricity is generated by the fuel cell by these reactions.

A membrane of an organic polymer material containing perfluorosulfonic acid, which is an organic polymer series ion exchange membrane, is known to the art as a proton conductive electrolyte membrane. To be more specific, NAFION (trade name) manufactured by Dupont Inc., which comprises tetrafluoroethylene-perfluoro vinyl ether copolymer as the base material and a sulfonic acid group as an ion exchange group, is known to the art as a proton conductive electrolyte membrane. Where an organic polymer material containing perfluoro sulfonic acid is used for forming an electrolyte membrane, the water contained in the membrane is decreased by the drying so as to lower the proton conductivity. As a result, a severe water supervision is required in the case where the electrolyte membrane is used in the vicinity of 100° C. at which a high output can be obtained so as to make the system highly complex. Also, the organic polymer material containing perfluoro sulfonic acid has a cluster structure so as to make the molecular structure sparse. As a result, the electrolyte membrane prepared by using the particular organic polymer material has a high permeability of an organic liquid fuel such as methanol so as to bring about a so-called "cross-over", i.e., the phenomenon that the organic liquid fuel is migrated to reach the cathode. If the cross-over is generated, the organic liquid fuel reacts directly with the oxidizing agent so as to make it impossible to generate energy in the form of an electric power. The particular situation gives rise to the problem that it is impossible to obtain a stable output.

A metal oxide supporting sulfuric acid, which exhibits a solid super acidity, is known to the art as an inorganic solid acid-based ion exchange membrane, as disclosed in, for example, Japanese Patent Disclosure (Kokai) No. 2002-216537. To be more specific, the metal oxide supporting sulfuric acid noted above is prepared by allowing the surface of an oxide containing at least one element selected from the group consisting of zirconium, titanium, iron, tin, silicon, aluminum, molybdenum and tungsten to support sulfuric acid, followed by applying a heat treatment to the oxide so as to fix the sulfuric acid to the surface of the oxide. The sulfate group fixed to the metal oxide exhibits the proton conductivity. However, in the case of the metal oxide, the sulfate group is liberated by the hydrolysis so as to lower the proton conductivity. It follows that the metal oxide supporting sulfuric acid is low in its stability when used as a material of the member of the fuel cell in which water is generated in the power generating process, particularly, when used as a material of the proton conductive electrolyte membrane included in a fuel cell using a liquid fuel. In other words, the metal oxide supporting sulfuric acid is not suitable for use for a stable power supply for a long time.

On the other hand, it is described in Japanese Patent Disclosure No. 2003-142124 that a metal oxide hydrate exhibiting a proton conductivity is used as a proton conductive substance. However, the structure of the metal oxide hydrate is shrunk, if the water of hydration is released by the drying caused by, for example, the power generation under high temperatures. What should be noted is that it is impossible to recover the original water of hydration even if water is supplied later so as to give rise to the problem that it is impossible to obtain a sufficient power generating performance.

PCT National Publication No. 2004-515351 (US 20040038105A) discloses an electrolyte membrane for a fuel cell, comprising an inorganic porous carrier and inorganic ionic conductor supported by the carrier. It is taught that the inorganic porous carrier is impregnated with an ionic liquid. To be more specific, it is taught that alumina particles are baked to a glass woven fabric used as the inorganic porous carrier by using a solution containing zirconia, followed by baking titania particles to the carrier by using a solution containing aluminum and vanadium.

BRIEF SUMMARY OF THE INVENTION

According to a first aspect of the present invention, there is provided an electrolyte membrane comprises a proton conductive inorganic material and a polymer material, and the proton conductive inorganic material including:

oxide particles containing at least one element X selected from the group consisting of W, Mo, Cr, B and V; and an oxide carrier carrying the oxide particles and containing at least one element Y selected from the group consisting of Sn, Hf, Ge, Ga, In, Ce and Nb.

According to a second aspect of the present invention, there is provided an electrolyte membrane comprising a proton conductive inorganic material and a polymer material, and the proton conductive inorganic material including:

oxide particles containing at least one element X selected from the group consisting of W, Mo, Cr, B and V;

an oxide carrier carrying the oxide particles and containing at least one element M selected from the group consisting of Ti, Zr, Si and Al; and at least one element Z contained in at least one of the oxide particles and the oxide carrier and selected from the group consisting of Y, Sc, La, Sm, Gd, Mg, Ca, Sr and Ba.

According to a third aspect of the present invention, there is provided an electrode, comprising:

a proton conductive inorganic material including oxide particles containing at least one element X selected from the group consisting of W, Mo, Cr, B and V, and an oxide carrier carrying the oxide particles and containing at least one element Y selected from the group consisting of Sn, Hf, Ge, Ga, In, Ce and Nb;

a polymer material; and a redox catalyst.

According to a fourth aspect of the present invention, there is provided an electrode comprising a proton conductive inorganic material, a polymer material and a redox catalyst, and the proton conductive inorganic material including:

oxide particles containing at least one element X selected from the group consisting of W, Mo, Cr, B and V;

an oxide carrier carrying the oxide particles and containing at least one element M selected from the group consisting of Ti, Zr, Si and Al; and at least one element Z contained in at least one of the oxide particles and the oxide carrier and selected from the group consisting of Y, Sc, La, Sm, Gd, Mg, Ca, Sr and Ba.

According to a fifth aspect of the present invention, there is provided a membrane electrode assembly comprising a fuel electrode, an oxidizing agent electrode, and an electrolyte membrane provided between the fuel electrode and the oxidizing agent electrode, wherein at least one of the fuel electrode, the oxidizing agent electrode, and the electrolyte membrane includes a proton conductive inorganic material including oxide particles containing at least one element X selected from the group consisting of W, Mo, Cr, B and V, and an oxide carrier carrying the oxide particles and containing at least one element Y selected from the group consisting of Sn, Hf, Ge, Ga, In, Ce and Nb.

According to a sixth aspect of the present invention, there is provided a membrane electrode assembly comprising a fuel electrode, an oxidizing agent electrode, and an electrolyte membrane provided between the fuel electrode and the oxidizing agent electrode, wherein at least one of the fuel electrode, the oxidizing agent electrode, and the electrolyte membrane includes a proton conductive inorganic material including:

oxide particles containing at least one element X selected from the group consisting of W, Mo, Cr, B and V;

an oxide carrier carrying the oxide particles and containing at least one element M selected from the group consisting of Ti, Zr, Si and Al; and at least one element Z contained in at least one of the oxide particles and the oxide carrier and selected from the group consisting of Y, Sc, La, Sm, Gd, Mg, Ca, Sr and Ba.

According to a seventh aspect of the present invention, there is provided a fuel cell comprising a fuel electrode, an oxidizing agent electrode, and an electrolyte membrane provided between the fuel electrode and the oxidizing agent electrode, wherein at least one of the fuel electrode, the oxidizing agent electrode, and the electrolyte membrane includes a proton conductive inorganic material including oxide particles containing at least one element X selected from the group consisting of W, Mo, Cr, B and V, and an oxide carrier carrying the oxide particles and containing at least one element Y selected from the group consisting of Sn, Hf, Ge, Ga, In, Ce and Nb.

According to an eighth aspect of the present invention, there is provided a fuel cell comprising a fuel electrode, an oxidizing agent electrode, and an electrolyte membrane provided between the fuel electrode and the oxidizing agent electrode, wherein at least one of the fuel electrode, the oxidizing agent electrode, and the electrolyte membrane comprises a proton conductive inorganic material including:

oxide particles containing at least one element X selected from the group consisting of W, Mo, Cr, B and V;

an oxide carrier carrying the oxide particles and containing at least one element M selected from the group consisting of Ti, Zr, Si and Al; and at least one element Z contained in at least one of the oxide particles and the oxide carrier and selected from the group consisting of Y, Sc, La, Sm, Gd, Mg, Ca, Sr and Ba.

According to a ninth aspect of the present invention, there is provided a proton conductive inorganic material, comprising:

oxide particles containing at least one element X selected from the group consisting of W, Mo, Cr, B and V; and an oxide carrier carrying the oxide particles and containing at least one element Y selected from the group consisting of Sn, Hf, Ge, Ga, In, Ce and Nb.

Further, according to a tenth aspect of the present invention, there is provided a proton conductive inorganic material, comprising:

oxide particles containing at least one element X selected from the group consisting of W, Mo, Cr, B and V;

an oxide carrier carrying the oxide particles and containing at least one element M selected from the group consisting of Ti, Zr, Si and Al; and at least one element Z contained in at least one of the oxide particles and the oxide carrier and selected from the group consisting of Y, Sc, La, Sm, Gd, Mg, Ca, Sr and Ba.

DETAILED DESCRIPTION OF THE INVENTION

Figure 1:
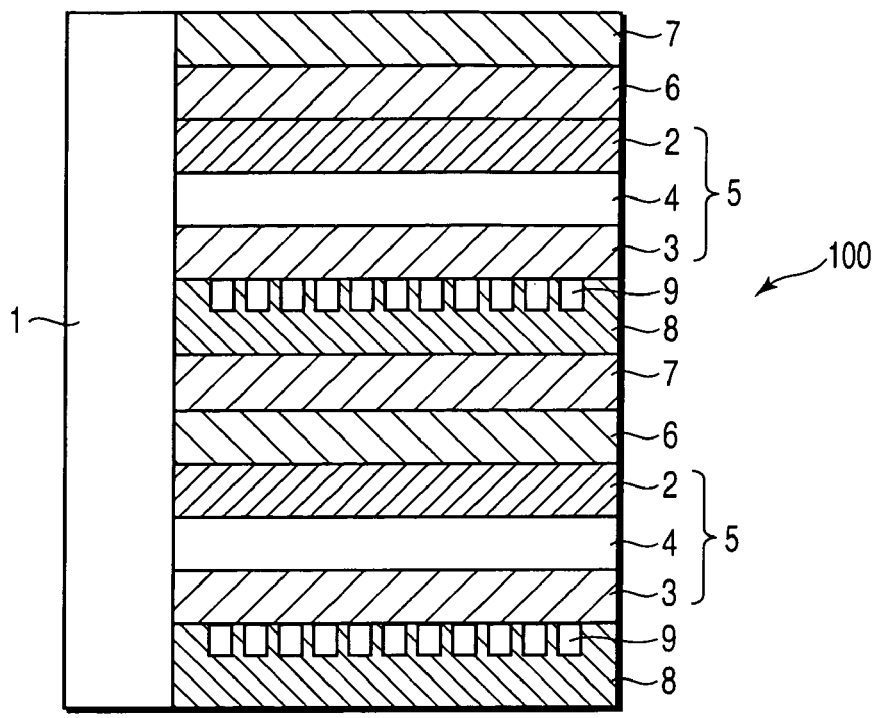
FIG. 1 is a cross sectional view schematically showing the construction of a fuel cell according to a sixth embodiment of the present invention.

It is impossible to obtain a high output in the fuel cell disclosed in each of Japanese Patent Disclosure No. 2002-216537 and Japanese Patent Disclosure No. 2003-142124 quoted previously. In addition, the fuel cell disclosed in these patent documents gives rise to difficulties described in the following. It should be noted that a large amount of entrained water is required for the proton conduction performed in the proton conductive electrolyte membrane so as to make it necessary to supply a sufficiently large amount of water into the electrolyte. Such being the situation, it is absolutely necessary to perform the water supervision requiring a complex system in order to achieve a stable power supply. It should also be noted that, in the case of the fuel cell using a liquid fuel such as methanol, it was impossible to control sufficiently the cross-over of methanol, resulting in failure to obtain a stable output.

In the proton conductive inorganic material according to each of the first and second embodiments of the present invention, it is possible to obtain high output characteristics in the fuel cell. In addition, the water supervision can be facilitated, and it is possible to suppress the cross-over of the liquid fuel such as methanol. Also, the proton conductive inorganic material according to each of the first and second embodiments of the present invention exhibits a high stability over a wide temperature region ranging between room temperature and high temperatures in the vicinity of 150° C. It follows that a high ionic conductivity can be maintained over a wide temperature region ranging between room temperature and high temperatures in the vicinity of 150° C.

First Embodiment

The proton conductive inorganic material according to the first embodiment of the present invention comprises oxide particles containing at least one kind of an element X selected from the group consisting of W, Mo, Cr, B and V and an oxide carrier supporting the oxide particles and containing at least one kind of an element Y selected from the group consisting of Sn, Hf, Ge, Ga, In, Ce and Nb.

The accurate mechanism of the proton conduction performed in the proton conductive inorganic material according to the first embodiment of the present invention has not yet been clarified sufficiently. However, it is considered reasonable to understand that, in the proton conductive inorganic material in which oxide particles containing an element X (hereinafter referred to as "oxide particle B") are supported on the surface of the oxide carrier containing an element Y (hereinafter referred to as "oxide carrier A"), a Lewis acid point is formed within the structure of the oxide particle B, and the Lewis acid point is hydrated so as to be converted into a Bronsted acid point, thereby forming a proton conduction field. It is also considered reasonable to understand that, in the case where the proton conductive inorganic material has an amorphous structure, the amorphous structure also contributes to the promotion of the Lewis acid point formation.

In addition to the proton-forming reaction performed in the Lewis acid point, it is possible to decrease the number of molecules of the entrained water required for the proton conduction in the proton conductive inorganic material according to the first embodiment of the present invention. As a result, it is possible to obtain a high proton conductivity with a smaller number of water molecules present on the surface of the proton conductive inorganic material, so as to make it possible to obtain a large power generation amount without performing a severe water supervision in the power generating stage. It follows that it is possible to lower the cell resistance of the fuel cell by allowing at least one of the fuel electrode, the oxidizing agent electrode and the electrolyte membrane to contain the proton conductive inorganic material according to the first embodiment of the present invention, with the result that it is possible to increase the maximum power generation amount of the fuel cell.

Also, the electrolyte membrane containing the proton conductive inorganic material according to the first embodiment of the present invention permits suppressing the transmission of the liquid fuel such as methanol. Particularly, if a polymer material is added to the electrolyte membrane in order to increase the bonding properties among the proton conductive inorganic materials, the density of the proton conductive electrolyte membrane is further increased so as to make it possible to suppress more effectively the transmission of the liquid fuel through the electrolyte membrane.

Incidentally, it is possible for the oxide particle B to exhibit a solubility in water, though the solubility is changed depending on the environment such as the kind of the element contained in the oxide particle B and the pH value. Since the oxide particle B is supported on the oxide carrier A having a low solubility in water, it is possible to suppress the dissolution of the oxide particle B in water so as to improve the stability of the proton conductive inorganic material relative to water and the liquid fuel. It should also be noted that the contamination of the other fuel cell materials and apparatus can be avoided by the presence of the ions generated from the dissolved oxide particles B. It follows that, according to the proton conductive inorganic material according to the first embodiment of the present invention, it is possible for the proton conductive inorganic material to exhibit a high reliability over a long time within a fuel cell. In other words, the fuel cell exhibits a high reliability over a long time. Further, since the oxide carrier A used as the base material is cheap, it is possible to suppress the manufacturing cost of the fuel cell.

It is possible to confirm that, in the proton conductive inorganic material, the oxide particles B are supported on the oxide carrier A by the method described in the following. For example, in the X-ray diffraction method (XRD), it is possible to obtain a diffraction pattern of the crystal lattice inherent in the crystalline substance. It is possible to confirm the presence of a crystalline substance supported on the oxide carrier A by comparing the diffraction pattern before the oxide particle B was supported on the oxide carrier A with the diffraction pattern after the oxide particle B was supported on the oxide carrier A. It is possible to employ the energy dispersive X-ray analysis (EDX) in place of the X-ray diffraction method (XRD). On the other hand, in the case where an amorphous substance is supported on the oxide carrier A, it is possible to confirm the presence of the amorphous substance supported on the oxide carrier A from the composition analysis such as an atomic absorption spectroscopy. For performing the composition analysis, it is possible to employ electron probe microanalysis (EPMA) or X-ray photoelectron spectroscopy (XPS).

Figure 3:
FIG. 3 is an electron micrograph showing the proton conductive inorganic material according to the first embodiment of the present invention.
Figure 4:
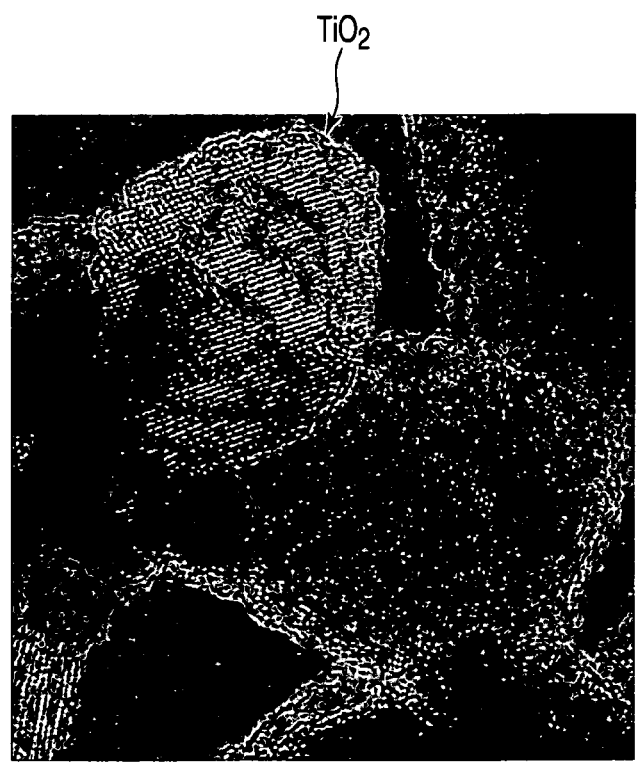
FIG. 4 is an electron micrograph showing $TiO_2$ particles.

FIG. 3 is an electron micrograph showing the proton conductive inorganic material in which oxide particles B formed of $MoO_3$ particles are supported on the surface of an oxide carrier A formed of $TiO_2$ particles. As shown in FIG. 3, the fine particles present on the surface of the oxide carrier A represent the oxide particles B. Also, FIG. 4 is an electron micrograph showing the $TiO_2$ particles not supporting the oxide particles B. As apparent from FIG. 4, fine particles are not present on the $TiO_2$ particles and, thus, the $TiO_2$ particle has a smooth surface. In this fashion, it is possible to confirm the presence of oxide particles supported on the oxide carrier by comparing the surface state of the oxide carrier A with the surface state of the oxide carrier not supporting the oxide particles.

The oxide carrier A can be synthesized by a vapor deposition in which an oxide is formed by decomposing a gas containing the element Y referred to previously or by a sol-gel method using as the raw material a metal alkoxide containing element Y referred to previously, though the synthesizing method of the oxide carrier A is not particularly limited in the present invention. Also, it is possible to use a composite oxide containing a plurality of different elements as the oxide carrier A. The oxides of the element Y noted above include, for example, $SnO_2$, $HfO_2$, $GeO_2$, $Ga_2O_3$, $In_2O_3$, $CeO_2$, and $Nb_2O_5$. In order to increase sufficiently the proton conductivity, it is desirable to use $SnO_2$ as the oxide of element Y.

Incidentally, it is possible for the oxide carrier A to be shaped granular, fibrous, flat-plate like, lamellar or porous, though the shape of the oxide carrier A is not limited to those exemplified above.

The oxide particles B can be supported on the surface of the oxide carrier A by the method described in the following. Specifically, the oxide carrier A is dispersed in a solution dissolving the substance containing the element X referred to previously, followed by evaporating the solvent from the solution and subsequently subjecting the substance containing the element X, which is present on the surface of the oxide carrier A, to a heat treatment so as to convert the substance containing the element X into oxide particles B, thereby allowing the oxide particles B to be supported on the surface of the oxide carrier A. The solution dissolving the substance containing the element X includes, for example, an aqueous solution of a chloride, an aqueous solution of a nitrate, an aqueous solution of hydroacid salt, an aqueous solution of oxoacid salt, and an alcohol solution of a metal alkoxide. Incidentally, the method of allowing the oxide particles to be supported on the oxide carrier is not limited to the method described above. Also, it is possible for the oxide particle B to be formed of a composite oxide containing a plurality of different elements.

It suffices for the oxide particles B to be supported on at least a part of the surface of the oxide carrier A. For example, it is possible for the oxide particles B to be dotted on the surface of the oxide carrier A. It is also possible for the oxide particle B to be layer in a manner to cover the surface of the oxide carrier A. The crystallinity of the oxide particle B and the oxide carrier A is not particularly limited. For example, it is possible for each of the oxide particle B and the oxide carrier A to be crystalline. In view of the effect of promoting the formation of the Lewis acid point, and improving any of the possibility of contribution to the improvement of the acidity, the reduction of the manufacturing cost, and the facilitation of the manufacturing process, it is desirable for each of the oxide particle B and the oxide carrier A to be amorphous. Further, it is more desirable for the oxide particle B to be amorphous and for the oxide carrier A to be crystalline, though it is possible for the oxide particle B to be crystalline and for the oxide carrier A to be amorphous.

The proton conductive inorganic material can be obtained by, for example, allowing the oxide particles B to be supported on the surface of the oxide carrier A by the baking method. It is possible for a sufficient acidity not to be obtained depending on the baking temperature because of the deficiency of the bonding strength. It is also possible for the constituting oxides of the proton conductive inorganic material to be scattered, resulting in failure to obtain a desired composition so as to decrease the proton conduction site. Further, the crystallinity of the oxide is increased by the application of the baking treatment so as to bring about a change in the crystal structure, with the result that a stress is generated in the proton conductive inorganic material. The stress generated in the proton conductive inorganic material tends to lower the bonding strength between the oxide carrier A and the oxide particles B so as to cause the oxide particles B to be separated from the oxide carrier A. The separation of the oxide particles B from the oxide carrier A causes the acidity to be lowered and also causes the proton conduction site to be decreased.

It is desirable to allow the proton conductive inorganic material to contain as a third component an oxide C containing at least one kind of an element Z selected from the group consisting of Y, Sc, La, Sm, Gd, Mg, Ca, Sr and Ba. In this case, the oxide C performs the function of a structure stabilizer of the proton conductive inorganic material. Specific examples of the oxide C include, for example, $Y_2O_3$, $Sc_2O_3$, $La_2O_3$, $Sm_2O_3$, $Gd_2O_3$, MgO, CaO, SrO and BaO. It is desirable for the oxide C to be contained in the oxide carrier A in order to obtain a high output from the fuel cell, though it is possible to permit oxide C to be contained in at least one of the oxide carrier A and the oxide particle B.

It is desirable for the proton conductive inorganic material to contain element Z noted above in an amount of 0.01 to 40 mol % relative to 100 mol % of the total molar amount of the element X, the element Y and the element Z. If the element Z is contained in an amount not smaller than 0.01 mol %, it is possible to improve the stability of the proton conductive inorganic material. On the other hand, the solid super acidity of the proton conductive inorganic material can be maintained if the content of the element Z is not larger than 40 mol %. It is more desirable for the content of the element Z in the proton conductive inorganic material to fall within a range of 0.1 to 10 mol %.

It is desirable for the proton conductive inorganic material to exhibit a solid super acidity. The dissociation degree of the proton can be expressed by the degree of the acidity, and the degree of the acidity of a solid acid can be expressed by the acid function $H_0$ of Hammett. In the case of sulfuric acid, the acid function $H_0$ is $-11.93$. It is more desirable for the proton conductive inorganic material to exhibit a solid super acidity of $H_0 < -11.93$. Also, it is possible to increase the acidity such that the acid function $H_0$ is $-20.00$ by optimizing the synthesizing method. It follows that it is possible to control the degree of acidity of the proton conductive inorganic material to fall within a range of $-20.00 \leqq H_0 < -11.93$. It is possible to obtain the solid super acidity of the proton conductive inorganic material by measuring the solid super acidity of a film containing a proton conductive inorganic material.

As described above, the proton conduction field is formed on the surface of the proton conductive inorganic material and, thus, it is desirable for the specific surface area of the proton conductive inorganic material to be as large as possible. However, if the specific surface area of the proton conductive inorganic material is increased to exceed 2,000 $m^2/g$, it is difficult to handle the proton conductive inorganic material and to control the uniform synthesis of the proton conductive inorganic material. On the other hand, if the specific surface area of the proton conductive inorganic material is smaller than 10 $m^2/g$, it is difficult to obtain a sufficient proton conductivity. It follows that it is desirable for the specific surface area of the proton conductive inorganic material to fall within a range of 10 to 2,000 $m^2/g$.

It is desirable for the ratio of the element X contained in the oxide particles B to the element Y contained in the oxide carrier A, i.e., the element ratio X/Y, to fall within a range of 0.0001 to 20. If the element ratio X/Y is smaller than 0.0001, the amount of the oxide particles B supported by the oxide carrier A is excessively small and, thus, the proton conductive field is small. It follows that the proton conductivity tends to be lowered. On the other hand, if the element ratio X/Y exceeds 20, the oxide particles B are supported in an excessively large amount on the oxide carrier A so as to cause the oxide carrier A to be covered completely with the oxide particles B containing the element X, with the result that the proton conductivity of the proton conductive inorganic material tends to be lowered. It is more desirable for the element ratio X/Y to fall within a range of 0.01 to 1.

The proton conductive inorganic material according to the first embodiment of the present invention can be obtained by, for example, allowing the precursor of the oxide particles B to be supported by the oxide carrier A, followed by applying a heat treatment to the precursor of the oxide particles B under an oxidizing atmosphere such as air. It should be noted that, if the heat treatment is applied under temperatures lower than 200° C., a sufficient chemical bond is not formed between the oxide carrier A and the oxide particle B, with the result that the proton conductivity of the resultant inorganic material tends to be lowered. On the other hand, if the heat treatment is applied under high temperatures exceeding 1,000° C., the oxide particles B are fused to each other so as to decrease the specific surface area of the proton conductive inorganic material. It follows that it is difficult to obtain a high proton conductivity. Under the circumstances, it is desirable for the heat treatment to be applied under temperatures falling within a range of 200 to 1,000° C. It should also be noted that, if the heat treatment is applied at a low temperature of 200° C., it is necessary to carry out the heat treatment for a long time in order to form a sufficient chemical bond between the oxide carrier A and the oxide particle B. On the other hand, if the heat treatment is carried out at a high temperature in the vicinity of 1,000° C., a chemical bond can be formed easily between the oxide carrier A and the oxide particle B so as to make it possible to synthesize the proton conductive inorganic material by the heat treatment for a short time. Such being the situation, it is more desirable for the heat treatment to be applied under temperatures of 400 to 700° C.

Second Embodiment

The proton conductive inorganic material according to a second embodiment of the present invention comprises oxide particles containing at least one kind of the element X selected from the group consisting of W, Mo, Cr, B and V (herein after referred to as "oxide particles B"), an oxide carrier supporting the oxide particles B and containing at least one kind the element M selected from the group consisting of Ti, Zr, Si and Al (herein after referred to as "oxide carrier M", and at least one kind of the element Z contained in at least one of the oxide particles B and the oxide carrier M and consisting of at least one element selected from the group consisting of Y, Sc, La, Sm, Gd, Mg, Ca, Sr and Ba.

The oxide containing the element Z (herein after referred to as "oxide C") serves to increase the structural stability of the proton conductive inorganic material. As a result, when the oxide particles B are formed by the heat treatment on the surface of the oxide carrier M, it is possible to suppress the stress generation within the proton conductive inorganic material. It follows that the oxide C permits sufficiently increasing the bonding strength between the oxide carrier M and the oxide particles B. It is also possible for the oxide C to suppress the scattering of the constituting oxide particles during the heat treatment.

As a result, in the proton conductive inorganic material according to the second embodiment of the present invention, it is possible to form Lewis acid points within the structure of the oxide particle B by the interaction between the oxide carrier M and the oxide particle B. Also, the proton conductive inorganic material according to the second embodiment of the present invention makes it possible to decrease the number of molecules of the entrained water required for the proton conduction.

It follows that it is possible to lower the cell resistance of the fuel cell and to increase the maximum power generation amount of the fuel cell by allowing at least one of the fuel electrode, the oxidizing agent electrode and the electrolyte membrane to contain the proton conductive inorganic material.

According to the electrolyte membrane containing the proton conductive inorganic material according to the second embodiment of the present invention, it is possible to suppress the transmission of the liquid fuel such as methanol. If a polymer material is added to the electrolyte membrane, the density of the electrolyte membrane can be further increased so as to make it possible to suppress more effectively the transmission of the liquid fuel through the electrolyte membrane.

It is desirable to use an oxide containing the element M as the oxide carrier. In this case, it is possible to increase the stability of the proton conductive inorganic material relative to water and the liquid fuel. As a result, it is possible to avoid the difficulty that the other fuel cell material and the apparatus are contaminated with the ions generated by the elution of the proton conductive inorganic material. It follows that, according to the proton conductive inorganic material according to the second embodiment of the present invention, it is possible to obtain a high reliability over a long time in the fuel cell. Further, the manufacturing cost of the fuel cell can be suppressed by using a cheap oxide carrier M as the base material.

Specific examples of the oxide C are similar to those pointed out previously in conjunction with the first embodiment of the present invention described previously. It is possible for the oxide C to be contained in at least one of the oxide carrier M and the oxide particle B. However, it is desirable for the oxide C to be contained in the oxide carrier M in order to obtain a high output from the fuel cell.

It is desirable for the proton conductive inorganic material to contain the element Z in an amount of 0.01 to 40 mol % relative to 100 mol % of the total molar amount of the element X, the element M and the element Z. If the amount of the element Z is not smaller than 0.01 mol %, it is possible to improve the stability of the proton conductive inorganic material. On the other hand, the solid super acidity of the proton conductive inorganic material can be maintained, if the amount of the element Z is not larger than 40 mol %. It is more desirable for the amount of the element Z to fall within a range of 0.1 to 10 mol %.

Whether the oxide particles B are supported by the oxide carrier M can be confirmed by the method described previously in conjunction with the first embodiment of the present invention.

The oxide carrier M can be synthesized by, for example, the vapor deposition in which a gaseous material containing the element M is decomposed or a sol-gel method that uses as the raw material a metal alkoxide containing the element M described previously. However, the synthetic method of the oxide carrier M is not particularly limited in the present invention. It is also possible to use as the oxide carrier M a composite oxide containing a plurality of different kinds of elements. The oxides of the element M include, for example, $TiO_2$, $ZrO_2$, $SiO_2$, and $Al_2O_3$. In order to obtain a high proton conductivity while suppressing the manufacturing cost, it is desirable to use $TiO_2$ as the oxide of the element M. Incidentally, it is possible for the oxide carrier M to be granular, fibrous, plate-like, lamellar or porous. However, the shape of the oxide carrier M is not limited to the shapes exemplified above.

It is possible to permit the oxide particles B to be supported by the surface of the oxide carrier M by a method similar to that described previously in conjunction with the first embodiment, except that the oxide carrier M is used in the second embodiment in place of the oxide carrier A used in the first embodiment.

It suffices for the oxide particles B to be supported by at least a part of the surface of the oxide carrier M. For example, it is possible for the oxide particles B to be dotted on the surface of the oxide carrier M. It is also possible for the oxide particle B to be layer so as to cover completely the surface of the oxide carrier M. The crystallinity of the oxide particle B and the oxide carrier M is not particularly limited. For example, it is possible for each of the oxide particle B and the oxide carrier M to be crystalline. In view of the effect of promoting the formation of the Lewis acid points and improving the possibility of the contribution to the improvement of the acidity, the reduction of the manufacturing cost and the facilitation of the manufacturing process, it is desirable for each of the oxide particle B and the oxide carrier M to be amorphous. Further, it is more desirable for the oxide particle B to be amorphous and for the oxide carrier M to be crystalline, though it is possible for the oxide particle B to be crystalline and for the oxide carrier M to be amorphous.

It is desirable for the proton conductive inorganic material to exhibit a solid super acidity. It is more desirable for the proton conductive inorganic material to exhibit a solid super acidity of $H_0 < -11.93$. It is furthermore desirable for the proton conductive inorganic material to exhibit a solid super acidity such that the acidity function $H_0$ satisfies the range of $-20.00 \leq H_0 < -11.93$. The solid super acidity of the proton conductive inorganic material can be measured by a method similar to that described previously in conjunction with the first embodiment of the present invention.

It is desirable for the specific surface area of the proton conductive inorganic material according to the second embodiment of the present invention to fall within a range of 10 to 2,000 $m^2/g$ by the reason described previously in conjunction with the first embodiment of the present invention.

It is desirable for the ratio of the element X contained in the oxide particle B to the element M contained in the oxide carrier M, i.e., the element ratio X/M, to fall within a range of 0.0001 to 20. If the element ratio X/M is not smaller than 0.0001, it is possible for a sufficiently large amount of the oxide particles B to be supported by the oxide carrier M. On the other hand, if the element ratio X/M is not larger than 20, it is possible to prevent the proton conduction field from being covered completely with the oxide particles B containing the element X. It is more desirable for the element ratio X/M to fall within a range of 0.01 to 1.

The proton conductive inorganic material according to the second embodiment of the present invention can be obtained by, for example, allowing the precursor of the oxide particles B to be supported by a carrier "a" consisting of a composite oxide of the element Z and the element M, followed by applying a heat treatment to the precursor of the oxide particles B under an oxidizing atmosphere such as the air atmosphere. In order to form a sufficient chemical bond between the carrier "a" and the oxide particles B without causing the carrier "a" and the oxide particles B to be fused to each other, it is desirable for the heat treating temperature to fall within a range of 200 to 1,000° C. It is more desirable for the heat treating temperature to fall within a range of 400 to 700° C.

Third Embodiment

A third embodiment of the present invention is directed to an electrolyte membrane comprising the proton conductive inorganic material according to the first embodiment of the present invention or the proton conductive inorganic material according to the second embodiment of the present invention and a polymer material.

In the electrolyte membrane according to the third embodiment of the present invention, it is desirable for the proton conductive inorganic material to be contained in the polymer material. It is more desirable for the proton conductive inorganic material to be bonded to the polymer material.

The polymer material, which is not particularly limited, includes, for example, polystyrene, polyether ketone, polyether ether ketone, polysulfone, polyether sulfone and other engineering plastic materials. It is also possible to use the material prepared by doping the polymer material with sulfonic acid, phosphoric acid or other proton carriers, or prepared by chemically bonding or fixing the proton carriers noted above to the polymer material. Alternatively, it is possible to use a polymer material exhibiting a proton conductivity such as perfluoro sulfonic acid. Further, it is possible to use a hydrophilic organic polymer material having at least one kind of the atomic group selected from the group consisting of a hydroxyl group, a carboxyl group, an ether bond and an amide bond. Particularly, it is desirable to use a hydrophilic organic polymer material in the third embodiment of the present invention.

Where the electrolyte membrane contains a hydrophilic organic polymer material containing at least one kind of the atomic group selected from the group consisting of a hydroxyl group, a carboxyl group, an ether bond and an amide bond, it is possible to suppress the phase separation between the proton conductive inorganic material and the hydrophilic organic polymer material so as to improve the dispersion capability of the proton conductive inorganic material. The electrolyte membrane obtained in this case exhibits a high water absorption capability so as to make it possible to supply a sufficiently large amount of water to the proton conductive inorganic material. It follows that it is possible to obtain a high proton conductivity and to decrease the membrane resistance. Also, since the proton conductive membrane has a high density, it is possible to suppress the penetration of the liquid fuel through the proton conductive membrane so as to suppress the methanol cross-over.

The examples of the hydrophilic organic polymer will now be described. The hydrophilic organic polymer having a hydroxyl group includes, for example, polyvinyl alcohol. The hydrophilic organic polymer having a carboxyl group includes, for example, polyacrylic acid. The hydrophilic organic polymer having an ether bond includes, for example, polyethylene glycol, cellulose, etc. Further, the hydrophilic organic polymer having an amide bond includes, for example, polyamide, polyvinyl pyrrolidone, etc. It is also possible to use an organic polymer having an ester bond.

Particularly, polyvinyl alcohol, which is a hydrophilic organic polymer having a hydroxyl group, has a high affinity with the proton conductive inorganic material so as to improve the dispersion capability of the proton conductive inorganic material. It is also possible for polyvinyl alcohol to suppress the phase separation between the proton conductive inorganic material and the hydrophilic organic polymer. As a result, it is possible to provide an electrolyte membrane excellent in the water absorption properties and in the capability of suppressing the methanol penetration.

It is desirable for polyvinyl alcohol to exhibit a degree of saponification falling within a range of 50 to 100%. If the degree of saponification of polyvinyl alcohol falls within a range of 50 to 100%, it is possible to decrease the resistance of the electrolyte membrane. The degree of saponification can be measured as follows. Polyvinyl alcohol is saponified completely with sodium hydroxide. Whether or not polyvinyl alcohol has been completely saponified can be confirmed by the infrared absorption analysis. The degree of saponification can be obtained from the unsaponified acetyl group. The unsaponified acetyl group can be obtained by adding sulfuric acid to a solution of the saponified polymer, followed by titrating the excess sulfuric acid with sodium hydroxide.

It is desirable for the hydrophilic polymer to exhibit an equilibrium moisture absorption rate of at least 5% at 20° C. or more. The hydrophilic polymer having such a high water absorption rate permits further lowering the membrane resistance of the electrolyte membrane. It is more desirable for the hydrophilic polymer to exhibit an equilibrium moisture absorption rate falling within a range of 5 to 95% under temperatures falling within a range of 20 to 90° C.

Incidentally, for measuring the equilibrium moisture absorption rate, a sample membrane was left to stand for one week under an environment of a constant temperature of not lower than 20° C. and a relative humidity not lower than 95% so as to permit the moisture absorption amount of the sample membrane to reach the state of equilibrium. Then, the weight of the sample membrane was measured. Further, the sample membrane taken out of the particular environment noted above was dried at 105° C. for 2 hours so as to measure the weight of the sample membrane. The equilibrium moisture absorption rate was measured on the basis of the difference in weight between the sample membrane put in the particular environment and the sample membrane after the drying at 105° C. for 2 hours. Incidentally, the sample membrane was prepared by dissolving the hydrophilic polymer in water so as to obtain a slurry, followed by casting the slurry thus obtained.

The electrolyte membrane using the hydrophilic organic polymer is prepared by, for example, the method described in the following. Specifically, the proton conductive inorganic material and the hydrophilic organic polymer are dispersed in a polar solvent such as water or alcohol so as to obtain a slurry. The slurry thus obtained is cast on a glass substrate or a resin substrate, followed by removing the solvent by drying. Then, a heat treatment is applied to the cast slurry at temperatures not higher than 200° C. It is considered reasonable to understand that the heat treatment under temperatures not higher than 200° C. brings about the oxidation reaction and the dehydrating reaction between the proton conductive inorganic material and the hydrophilic organic polymer, the interaction of the hydrogen bonds, and the crystallization of the hydrophilic organic polymer so as to make it possible to prevent the swelling and the dissolution of the hydrophilic organic polymer, though the detailed mechanism has not yet been clarified sufficiently. In the case of using polyvinyl alcohol, the result of infrared spectroscopic analysis (IR) suggests that, by the heat treatment under temperatures not higher than 200° C., the hydroxyl group in the polyvinyl alcohol is oxidized by the solid super acid so as to be converted into a hydrophobic ketone group.

If the electrolyte membrane is prepared by performing the slurry preparation and the heat treatment by the method described above using polyvinyl alcohol, it is possible to lower appropriately the dissolution capability of polyvinyl alcohol in a polar solvent such as water without impairing the affinity with the proton conductive inorganic material. It follows that it is possible to improve the shape-retaining capability of the electrolyte membrane in the stage of absorbing water while maintaining a good dispersion stability of the slurry. As a result, it is possible to provide an electrolyte membrane excellent in the water absorption capability and capable of suppressing the methanol penetration. Also, by applying the heat treatment described above, it is possible to obtain a membrane excellent in the shape-retaining capability even in the case of using water as a solvent in preparing the slurry. The use of water as a solvent permits further improving the hydrophilic properties of the membrane.

It is necessary to apply the heat treatment under temperatures at which the hydrophilic organic polymer is not decomposed or deteriorated. To be more specific, it is desirable for the heat treatment to be applied at temperatures not higher than 200° C. Also, in order to permit the heat treatment to produce its effect sufficiently, it is desirable for the heat treatment to be carried out at temperatures not lower than 100° C. It is more desirable for the heat treating temperature to fall within a range of 130 to 180° C.

It is desirable to determine appropriately the mixing ratio of the proton conductive inorganic material to the hydrophilic organic polymer such that the penetration of the liquid fuel through the electrolyte membrane can be inhibited while maintaining a high proton conductivity. To be more specific, it is desirable for the weight ratio of the proton conductive inorganic material (S) to the total weight of the membrane (T), i.e., the weight ratio S/T, to fall within a range of 0.1 to 0.999. Incidentally, if the weight ratio S/T is lower than 0.1, the continuity of the proton conductive inorganic materials tends to be lowered so as to lower the conductivity. It is more desirable for the weight ratio S/T to fall within a range of 0.5 to 0.999.

Where the electrolyte membrane is used as a polymer electrolyte membrane of a fuel cell, the electrolyte membrane can be used in general in the form of a sheet. However, it is also possible to use the electrolyte membrane in the form of a cylinder. To be more specific, it is possible to subject a dispersion mixture of the proton conductive inorganic material and the organic polymer material to the casting into a membrane. It is also possible to employ the method of impregnating a porous material with the dispersion mixture noted above, thereby obtaining a membrane. The porous material includes, for example, a woven fabric and an unwoven fabric.

In order to obtain a membrane capable of withstanding the practical use in terms of the mechanical strength, the penetration capability of the liquid fuel and the proton conductivity, it is desirable for the electrolyte membrane to have a thickness not smaller than 10 µm, though the thickness of the electrolyte membrane is not particularly limited in the present invention. Also, in order to lower the membrane resistance, it is desirable for the electrolyte membrane to have a thickness not larger than 300 µm. Particularly, in order to decrease the internal resistance of the fuel cell, it is desirable for the electrolyte membrane to have a thickness falling within a range of 10 to 100 µm.

The thickness of the electrolyte membrane can be controlled by, for example, the method described in the following, though the method of controlling thickness of the electrolyte membrane is not particularly limited in the present invention. Specifically, in the case where a dispersion mixture of the proton conductive inorganic material and the organic polymer material is subjected to casting directly into a membrane, the thickness of the electrolyte membrane can be controlled by controlling the amount of the dispersion mixture to be cast or by changing the casting area. It is also possible to heat press the electrolyte membrane by using, for example, a hot press machine so as to make uniform the thickness of the electrolyte membrane.

Fourth Embodiment

A fourth embodiment of the present invention is directed to an electrode comprising a catalyst layer containing a redox catalyst, the proton conductive inorganic material according to the first embodiment of the present invention or the proton conductive inorganic material according to the second embodiment of the present invention, and a polymer material acting as a binder. It is possible to use the electrode according to the fourth embodiment of the present invention as a fuel electrode or as an oxidizing agent electrode of a fuel cell. It is also possible to use the electrode both as a fuel electrode and as an oxidizing agent electrode.

Each of the fuel electrode and the oxidizing agent electrode is formed of a porous structure capable of gas diffusion and, thus, it is possible for the fuel gas, the liquid fuel or the oxidizing gas to pass through the fuel electrode and the oxidizing agent electrode. Since the fuel electrode serves to promote the oxidizing reaction of the fuel and the oxidizing agent electrode serves to promote the reduction of oxygen, a redox catalyst is supported on a conductive support material such as carbon in the fuel electrode and in the oxidizing agent electrode. The redox catalyst includes a metal catalyst such as platinum, gold, silver, palladium, iridium, rhodium, ruthenium, iron, cobalt, nickel, chromium, tungsten, molybdenum, manganese and vanadium. It is possible to use a single metal as the metal catalyst. It is also possible to use a binary alloy or a ternary alloy as the metal catalyst. Particularly, platinum that exhibits a high catalytic activity is used as the metal catalyst in many cases. It suffices for the supporting material supporting the redox catalyst to be electrically conductive. In many cases, a carbon material is used as the supporting material. For example, a carbon black such as a furnace black, a channel black, or an acetylene black as well as an activated carbon and graphite can be used as the supporting material of the redox catalyst.

It is possible to permit the redox catalyst to be supported by the carbon material by, for example, the method described in the following, though the method of allowing the redox catalyst to be supported by the carbon material is not particularly limited in the present invention. Specifically, the carbon material is dispersed in a solution dissolving the substance containing the metal element acting as a catalyst. Then, the solvent in the solution is removed by evaporation, followed by applying a heat treatment to the residue under a reducing atmosphere so as to permit the redox catalyst to be supported by the carbon material. The solution dissolving the substance containing the metal element includes, for example, an aqueous solution of a chloride, an aqueous solution of a nitrate, an aqueous solution of a hydroacid salt, an aqueous solution of an oxoacid salt, and an alcohol solution of a metal alkoxide. It is possible for the metal particles acting as the catalytic component to have a diameter of 1 to 50 nm. Also, it is possible for the catalytic metal component to be contained in the electrode in an amount of 0.01 to 10 mg/cm$^2$.

It is desirable for the proton conductive inorganic material contained in the catalyst layers of the fuel electrode and the oxidizing agent electrode to maintain a sufficient continuity because the proton conductive inorganic material forms a route for transferring the protons. It is possible for the proton conductive inorganic material to be used singly or in the form that the proton conductive inorganic material is supported on the carbon material. It is desirable for the proton conductive inorganic material to be contained in the electrode in an amount of 0.01 to 50 mg/cm$^2$.

It is possible for the polymer material used as a binder to be substantially equal to that described previously in conjunction with the third embodiment of the present invention.

If the weight ratio of the polymer material P to the amount of the catalyst layer C, i.e., the weight ratio P/C, is higher than 0.5, the continuity of the proton conductive inorganic material and the redox catalyst tends to be lowered so as to lower the proton conductivity and electron conductivity. In order to form a catalyst layer structure retaining a porosity while maintaining a high proton conductivity and a high electron conductivity, it is desirable for the weight ratio P/C noted above to fall within a range of 0.001 to 0.5.

It is possible for the electrode to be formed of a catalyst layer alone or for the catalyst layer to be formed on another support member so as to form the electrode, though the method of forming the electrode is not particularly limited in the present invention. For example, it is possible to form the electrode by dispersing the redox catalyst, the proton conductive inorganic material and the polymer material in water or an organic solvent such as alcohol so as to obtain a slurry, followed by coating a supporting body with the slurry and subsequently drying and baking the coated slurry. It is possible to use, for example, the electrolyte membrane as the supporting body, though the supporting body used is not particularly limited in the present invention. In the case of using the electrolyte membrane as the supporting body, it is possible to obtain a membrane electrode assembly comprising the electrolyte membrane and catalyst layers formed on both surfaces of the electrolyte membrane. It is also possible for the supporting body to be formed of, for example, a carbon paper, a carbon felt or a carbon cloth having a gas permeability and an electric conductivity.

Fifth Embodiment

A fifth embodiment of the present invention is directed to a membrane electrode assembly, comprising a fuel electrode, an oxidizing agent electrode, and an electrolyte membrane provided between the fuel electrode and the oxidizing agent electrode. It should be noted that at least one of the fuel electrode, the oxidizing agent electrode and the electrolyte membrane contains the proton conductive inorganic material according to the first embodiment of the present invention or the proton conductive inorganic material according to the second embodiment of the present invention. To be more specific, the membrane electrode assembly according to the fifth embodiment of the present invention includes, for example, a membrane electrode assembly comprising the electrolyte membrane according to the third embodiment of the present invention, a membrane electrode assembly in which the electrode according to the fourth embodiment of the present invention is used as the fuel electrode or as the oxidizing agent electrode, or used both as the fuel electrode and as the oxidizing agent electrode, and a membrane electrode assembly comprising the electrolyte membrane according to the third embodiment of the present invention, in which the electrode according to the fourth embodiment of the present invention is used as the fuel electrode or as the oxidizing agent electrode or used both as the fuel electrode and as the oxidizing agent electrode.

The electrolyte membrane and the electrode can be bonded to each other by using an apparatus capable of performing the heating and the pressurizing. In this case, it suffices for the pressing temperature to be not lower than the glass transition temperature of the organic polymer material used as a binder in the electrolyte membrane. To be more specific, it is possible to set the pressing temperature noted above at 100 to 400° C. On the other hand, the pressure in the bonding stage of the electrolyte membrane to the electrode can be set to fall within a range of 5 to 200 kg/cm$^2$, though the pressure noted above depends on the hardness of the electrode.

Sixth Embodiment

A sixth embodiment of the present invention is directed to a fuel cell comprising the membrane electrode assembly according to the fifth embodiment of the present invention.

The fuel cell according to the sixth embodiment of the present invention will now be described with reference to the accompanying drawings. Specifically, FIG. 1 is a cross sectional view schematically showing the construction of the fuel cell according to the sixth embodiment of the present invention.

The liquid fuel cell shown in FIG. 1 comprises a stack 100 prepared by stacking a plurality of unit cells one upon the other. A fuel introducing path 1 is arrange on the side surface of the stack 100. A liquid fuel is supplied from a liquid fuel tank (not shown) into the fuel introducing path 1 via an introducing pipe (not shown). It is desirable for the liquid fuel to contain methanol. To be more specific, it is possible to use, for example, an aqueous solution of methanol or methanol itself as the liquid fuel. In other words, it is possible to use methanol alone as the liquid fuel. Each unit cell comprises a membrane electrode assembly 5 consisting essentially of a fuel electrode 2, which is also called an anode, an oxidizing agent electrode 3, which is also called a cathode, and an electrolyte membrane 4 interposed between the fuel electrode 2 and the oxidizing agent electrode 3. It is desirable for each of the fuel electrode 2 and the oxidizing agent electrode 3 to be formed of a porous conductive material so as to permit the fuel, the oxidizing gas and electrons to be circulated therethrough.

Each unit cell further comprises a fuel evaporating section 6 stacked on the fuel electrode 2, a fuel permeating section 7 stacked on the fuel evaporating section 6, and a cathode separator 8 stacked on the oxidizing agent electrode 3. The fuel permeating section 7 performs the function of retaining the liquid fuel, which is supplied from the fuel introducing path 1. The fuel evaporating section 6 plays the role of guiding the gasified component of the liquid fuel held in the fuel permeating section 7 to the fuel electrode 2. It should be noted that an oxidizing gas supply channel 9 for circulating the oxidizing gas is formed as a continuous groove on that surface of the cathode separator 8 which is positioned to face the oxidizing agent electrode 3. The cathode separator 8 also plays the role of connecting in series the adjacent membrane electrode assembly 5.

Incidentally, where the unit cells are stacked one upon the other so as to form the stack 100 as shown in FIG. 1, each of the separator 8, the fuel permeating section 7 and the fuel evaporating section 6 also perform the function of a current collector for transmitting the generated electrons. Such being the situation, it is desirable for each of the separator 8, the fuel permeating section 7 and the fuel evaporating section 6 to be formed of a porous conductive material containing carbon.

As described above, the separator 8 included in the unit cell shown in FIG. 1 also performs the function of a channel for circulating the oxidizing gas. Such being the situation, it is possible to miniaturize further the fuel cell by using a member performing the functions of both the separator and the channel, i.e., the member, which is called a channel-having separator herein later, because the number of parts used can be decreased in the case of using the channel-having separator. Alternatively, it is also possible to use an ordinary channel in place of the separator 8.

The liquid fuel can be supplied from the fuel storing tank (not shown) into the liquid fuel introducing path by, for example, utilizing the free fall of the liquid fuel housed in the fuel storing tank. In this method, the liquid fuel can be introduced into the liquid fuel introducing path without fail, though there is a structural restriction that it is necessary to arrange the fuel storing tank in a position higher than the upper surface of the stack 100. It is also possible to supply the liquid fuel from the fuel storing tank into the liquid fuel introducing path 1 by utilizing the capillary force of the liquid fuel introducing path. In this case, it is unnecessary for the connecting point between the fuel storing tank and the liquid fuel introducing path 1, i.e., the fuel inlet port of the liquid fuel introducing path 1, to be positioned higher than the upper surface of the stack 100. It follows that, if this method is combined with, for example, the free fall method described above, it is possible to obtain the merit that the installing site of the fuel tank can be determined freely.

As described above, it is possible to supply the liquid fuel from the fuel storing tank into the liquid fuel introducing path 1 by utilizing the capillary action. It should be noted that, in order to further smoothly supply the liquid fuel from the liquid fuel introducing path 1 into the fuel permeating section 7 by utilizing capillary action, it is desirable for the capillary action for supplying the liquid fuel into the fuel permeating section 7 to be larger than the capillary action for supplying the liquid fuel into the liquid fuel introducing path 1. Incidentally, a single liquid fuel introducing path 1 is formed along the side surface of the stack 100 in the construction shown in FIG. 1. However, it is also possible to form another liquid fuel introducing path along the other side surface of the stack 100.

Also, the fuel storing tank described above can be mounted detachable from the fuel cell. In this case, it is possible to renew the fuel storing tank, as required, so as to make it possible to operate the fuel cell continuously for a long time. It should also be noted that the fuel cell can be constructed such that the liquid fuel can be supplied from the fuel storing tank into the liquid fuel introducing path 1 by utilizing the free fall of the liquid fuel, by utilizing the internal pressure of the fuel storing tank so as to push out the liquid fuel, or by utilizing the capillary action.

The liquid fuel introduced into the liquid fuel introducing path 1 by the method described above is supplied into the fuel permeating section 7. The construction of the fuel permeating section 7 is not particularly limited as far as the fuel permeating section 7 performs the functions of holding the liquid fuel in the inner region thereof and of supplying selectively the gasified fuel into the fuel electrode 2 through the fuel evaporating section 6. For example, it is possible for the fuel permeating section 7 to include a passageway of a liquid fuel and a gas-liquid separating membrane formed at the interface with the fuel evaporating section 6. Further, where the liquid fuel is supplied into the fuel permeating section 7 by utilizing capillary action without using auxiliary equipment, the construction of the fuel permeating section 7 is not particularly limited as far as the liquid fuel can be permeated by capillary action. For example, it is possible for the fuel permeating section 7 to be formed of a porous body consisting essentially of particles and a filler, to be formed of an unwoven fabric made by the paper-making method, to be formed of a woven fabric prepared by weaving fibers, or to be formed of a small clearance provided by, for example, a glass plate or a plastic plate.

As described above, the fuel permeating section 7 can be formed by using a porous body. In this case, the capillary force required for sucking the liquid fuel into the fuel permeating section 7 includes, for example, the capillary force of the porous body constituting the fuel permeating section 7. In the case of utilizing such a capillary force, it is desirable for the pores of the fuel permeating section to be a so-called "open cell". And, it is desirable to control the diameter of the open cell. Also, it is desirable for the open cell to extend from the side surface of the fuel permeating section 7 which faces the liquid fuel introducing path 1 to reach the other side surface of the fuel permeating section 7 so as to permit the liquid fuel to be supplied smoothly in the lateral direction by capillary action.

The diameter of the pores of the porous body used as the fuel permeating section 7 is not particularly limited as far as the liquid fuel in the liquid fuel introducing path 1 can be sucked by the capillary action into the fuel permeating section 7. However, it is desirable for the pores of the porous body forming the fuel permeating section 7 to have a diameter of about 0.01 to 150 μm in view of the capillary force produced by the liquid fuel introducing path 1. Also, it is desirable for the volume of the pores of the porous body forming the fuel permeating section 7, which provides an index of the continuity of the pores, to be about 20 to 90% of the porous body. If the diameter of the pore is smaller than 0.01 μm, it is difficult to manufacture the fuel permeating section 7. On the other hand, if the diameter of the pore exceeds 150 μm, the capillary force of the porous body forming the fuel permeating section 7 tends to be lowered. Also, if the volume of the pores is smaller than 20% of the porous body, the amount of the open cells is decreased so as to increase the amount of the closed cells, with the result that it is difficult to obtain a sufficiently large capillary force. On the other hand, if the volume of the pores exceeds 90% of the porous body forming the fuel permeating section 7, the amount of the open cells is certainly increased. However, the mechanical strength of the fuel permeating section 7 is lowered, and it is difficult to prepare the fuel permeating section 7. In practice, it is desirable for the porous body used for forming the fuel permeating section 7 to have pores having a diameter falling within a range of 0.5 to 100 μm and to have a pore volume falling within a range of 30 to 75% of the porous body.

In order to permit the electrolyte membrane to exhibit sufficiently the capability of transmitting the protons, it is desirable for the fuel cell to be operated at the temperature at which the water supervision is facilitated. It is desirable for the fuel cell to be operated at temperatures falling within a range of room temperature to 150° C. If the fuel cell is operated under temperatures falling within a range of 50 to 150° C., the catalytic activity of the electrode is improved so as to decrease the over-voltage of the electrode.

The present invention will now be described in more detail with reference to Examples of the present invention. Needless to say, the technical scope of the present invention is not limited by the following Examples.

Example 1

A mixed solution prepared by adding 6 g of gallium oxide $Ga_2O_3$ to 300 mL of an ethanol solution having 0.7 g of trimethyl borate $B(OCH_3)_3$ dissolved therein was heated to 80° C. while stirring the mixed solution so as to remove water by evaporation from the mixed solution at an evaporating rate of 100 mL/h. Then, the residue was held for 12 hours within a dryer set at 100° C. so as to obtain a powdery material. The powdery material thus obtained was pulverized by using an agate mortar, followed by heating the pulverized powder to 700° C. within an alumina mortar at a heating rate of 100° C./h. The heated powdery material was held at 700° C. for 4 hours so as to obtain a gallium oxide carrier supporting boron oxide particles, which constituted the proton conductive inorganic material. The ratio of the boron element X contained in the boron oxide particle to the gallium element Y contained in the gallium oxide carrier, i.e., the element ratio X/Y, was found to be 0.1. Also, the specific surface area of the proton conductive inorganic material was found to be as shown in Table 1. The gallium oxide carrier supporting the boron oxide particles was subjected to X-ray diffraction measurement, with the result that all the diffraction peaks observed were ascribed to the gallium oxide, supporting that boron oxide had an amorphous structure.

The element ratio X/Y and the specific surface area of the proton conductive inorganic material powder were measured as follows.

Specifically, for measuring the element ratio X/Y, the proton conductive inorganic material powder was dissolved in a solvent by using an acid or an alkali, and the element ratio X/Y was determined by the atomic absorption spectrometry applied to the resultant solution. On the other hand, the specific surface area of the proton conductive inorganic material powder was measured by the BET method.

On the other hand, 1 g of the proton conductive inorganic material powder was added to 2 g of a solution of N,N-dimethyl acetamide (DMAc) containing 5% of polyacrylonitrile (PAN), and the resultant liquid system was stirred for 10 minutes at room temperature so as to prepare a slurry. The slurry thus prepared was put in a petri dish formed of a tetrafluoro ethylene-perfluoro alkoxy vinyl ether copolymer (PFA) resin, and the slurry was dried at 60° C. under an air atmosphere so as to obtain an electrolyte membrane. The weight ratio of the proton conductive inorganic material S to the amount T of the membrane, i.e., the weight ratio S/T, was found to be 0.9, and the thickness of the electrolyte membrane was found to be 151 μm.

Example 2

A mixed solution prepared by adding 6 g of gallium oxide $Ga_2O_3$ to 300 mL of a distilled water having 1 g of vanadium chloride $VCl_3$ dissolved therein was heated to 80° C. while stirring the mixed solution so as to remove water by evaporation from the mixed solution at an evaporating rate of 100 mL/h. Then, the residue was held for 12 hours within a dryer set at 100° C. so as to obtain a powdery material. The powdery material thus obtained was pulverized by using an agate mortar, followed by heating the pulverized powder to 700° C. within an alumina mortar at a heating rate of 100° C./h. The heated powdery material was held at 700° C. for 4 hours so as to obtain a gallium oxide carrier supporting the vanadium oxide particles, which constituted the proton conductive inorganic material. The ratio of the vanadium element X contained in vanadium oxide particle to the gallium element Y contained in the gallium oxide carrier, i.e., the element ratio X/Y, was found to be 0.1. Also, the specific surface area of the proton conductive inorganic material was found to be as shown in Table 1. The gallium oxide carrier supporting the vanadium oxide particles was subjected to the X-ray diffraction measurement, with the result that all the diffraction peaks observed were ascribed to the gallium oxide, supporting that the vanadium oxide particle had an amorphous structure.

On the other hand, 1 g of the proton conductive inorganic material powder thus obtained was added to 2 g of a solution of N,N-dimethyl acetamide (DMAc) containing 5% of polyacrylonitrile (PAN), and the resultant liquid system was stirred for 10 minutes at room temperature so as to prepare a slurry. The slurry thus prepared was put in a petri dish formed of a tetrafluoro ethylene-perfluoro alkoxy vinyl ether copolymer (PFA) resin, and the slurry was dried at 60° C. under an air atmosphere so as to obtain an electrolyte membrane. The weight ratio of the proton conductive inorganic material S to the amount T of the membrane, i.e., the weight ratio S/T, was found to be 0.9, and the thickness of the electrolyte membrane was found to be 150 μm.

Example 3

A mixed solution prepared by adding 6 g of gallium oxide $Ga_2O_3$ to 300 mL of a distilled water having 1.7 g of chromium chloride hexahydrate $CrCl_3.6H_2O$ dissolved therein was heated to 80° C. while stirring the mixed solution so as to remove water by evaporation from the mixed solution at an evaporating rate of 100 mL/h. Then, the residue was held for 12 hours within a dryer set at 100° C. so as to obtain a powdery material. The powdery material thus obtained was pulverized by using an agate mortar, followed by heating the pulverized powder to 700° C. within an alumina mortar at a heating rate of 100° C./h. The heated powdery material was held at 700° C. for 4 hours so as to obtain a gallium oxide carrier supporting the chromium oxide particles, which constituted the proton conductive inorganic material. The ratio of the chromium element X contained in a chromium oxide particle to the gallium element Y contained in the gallium oxide carrier, i.e., the element ratio X/Y, was found to be 0.1. Also, the specific surface area of the proton conductive inorganic material was found to be as shown in Table 1. The gallium oxide carrier supporting the chromium oxide particles was subjected to the X-ray diffraction measurement, with the result that all the diffraction peaks observed were ascribed to the gallium oxide, supporting that the chromium oxide particle had an amorphous structure.

On the other hand, 1 g of the proton conductive inorganic material powder thus obtained was added to 2 g of a solution of DMAc containing 5% of PAN, and the resultant liquid system was stirred for 10 minutes at room temperature so as to prepare a slurry. The slurry thus prepared was put in a petri dish formed of a PFA resin, and the solvent was dried at 60° C. under an air atmosphere so as to obtain an electrolyte membrane. The weight ratio of the proton conductive inorganic material S to the amount T of the membrane, i.e., the weight ratio S/T, was found to be 0.9, and the thickness of the electrolyte membrane was found to be 151 µm.

Example 4

A mixed solution prepared by adding 6 g of gallium oxide $Ga_2O_3$ to 300 mL of a distilled water having 1.1 g of ammonium molybdate $((NH_4)_6Mo_7O_{24}.4H_2O)$ dissolved therein was heated to 80° C. while stirring the mixed solution so as to remove water by evaporation from the mixed solution at an evaporating rate of 100 mL/h. Then, the residue was held for 12 hours within a dryer set at 100° C. so as to obtain a powdery material. The powdery material thus obtained was pulverized by using an agate mortar, followed by heating the pulverized powder to 700° C. within an alumina mortar at a heating rate of 100° C./h. The heated powdery material was held at 700° C. for 4 hours so as to obtain a gallium oxide carrier supporting the molybdenum oxide particles, which constituted the proton conductive inorganic material. The ratio of the molybdenum element X contained in the molybdenum oxide particle to the gallium element Y contained in the gallium oxide carrier, i.e., the element ratio X/Y, was found to be 0.1. Also, the specific surface area of the proton conductive inorganic material was found to be as shown in Table 1. The gallium oxide carrier supporting the molybdenum oxide particles was subjected to the X-ray diffraction measurement, with the result that all the diffraction peaks observed were ascribed to the gallium oxide, supporting that the molybdenum oxide particle had an amorphous structure.

On the other hand, 1 g of the proton conductive inorganic material powder thus obtained was added to 2 g of a solution of DMAc containing 5% of PAN, and the resultant liquid system was stirred for 10 minutes at room temperature so as to prepare a slurry. The slurry thus prepared was put in a petri dish formed of a PFA resin, and the slurry was dried at 60° C. under an air atmosphere so as to obtain an electrolyte membrane. The weight ratio of the proton conductive inorganic material S to the amount T of the membrane, i.e., the weight ratio S/T, was found to be 0.9, and the thickness of the electrolyte membrane was found to be 152 µm.

Example 5

A mixed solution prepared by adding 6 g of gallium oxide $Ga_2O_3$ to 300 mL of an ethanol solution having 2.5 g of tungsten chloride $WCl_6$ dissolved therein was heated to 80° C. while stirring the mixed solution so as to remove water by evaporation from the mixed solution at an evaporating rate of 100 mL/h. Then, the residue was held for 12 hours within a dryer set at 100° C. so as to obtain a powdery material. The powdery material thus obtained was pulverized by using an agate mortar, followed by heating the pulverized powder to 700° C. within an alumina mortar at a heating rate of 100° C./h. The heated powdery material was held at 700° C. for 4 hours so as to obtain a gallium oxide carrier supporting the tungsten oxide particles, which constituted the proton conductive inorganic material. The ratio of the tungsten element X contained in the tungsten oxide particle to the gallium element Y contained in the gallium oxide carrier, i.e., the element ratio X/Y, was found to be 0.1. Also, the specific surface area of the proton conductive inorganic material was found to be as shown in Table 1. The gallium oxide carrier supporting the tungsten oxide particles was subjected to the X-ray diffraction measurement, with the result that all the diffraction peaks observed were ascribed to the gallium oxide, supporting that the tungsten oxide particle had an amorphous structure.

On the other hand, 1 g of the proton conductive inorganic material powder thus obtained was added to 2 g of a solution of DMAc containing 5% of PAN, and the resultant liquid system was stirred for 10 minutes at room temperature so as to prepare a slurry. The slurry thus prepared was put in a petri dish formed of a PFA resin, and the slurry was dried at 60° C. under an air atmosphere so as to obtain an electrolyte membrane. The weight ratio of the proton conductive inorganic material S to the amount T of the membrane, i.e., the weight ratio S/T, was found to be 0.9, and the thickness of the electrolyte membrane was found to be 152 µm.

Example 6

A proton conductive inorganic material consisting essentially of an indium oxide carrier supporting the boron oxide particles and having the element ratio X/Y as shown in Table 1 was obtained as in Example 1, except that 6 g of gallium oxide used in Example 1 was replaced by 9 g of indium oxide $(In_2O_3)$. An electrolyte membrane having the weight ratio S/T of 0.9 and the thickness of 153 µm was obtained by using the proton conductive inorganic material consisting essentially of the indium oxide carrier supporting the boron oxide particles thus prepared.

Example 7

A proton conductive inorganic material consisting essentially of an indium oxide carrier supporting the vanadium oxide particles and having the element ratio X/Y as shown in Table 1 was obtained as in Example 2, except that 6 g of gallium oxide used in Example 2 was replaced by 9 g of indium oxide ($In_2O_3$). An electrolyte membrane having the weight ratio S/T of 0.9 and the thickness of 152 μm was obtained by using the proton conductive inorganic material thus prepared, which consisted essentially of the indium oxide carrier supporting the vanadium oxide particles.

Example 8

A proton conductive inorganic material consisting essentially of an indium oxide carrier supporting the chromium oxide particles and having the element ratio X/Y as shown in Table 1 was obtained as in Example 3, except that 6 g of gallium oxide used in Example 3 was replaced by 9 g of indium oxide ($In_2O_3$). An electrolyte membrane having the weight ratio S/T of 0.9 and the thickness of 153 μm was obtained by using the proton conductive inorganic material consisting essentially of the indium oxide carrier thus prepared, which supported the chromium oxide particles.

Example 9

A proton conductive inorganic material consisting essentially of an indium oxide carrier supporting the molybdenum oxide particles and having the element ratio X/Y as shown in Table 1 was obtained as in Example 4, except that 6 g of gallium oxide used in Example 4 was replaced by 9 g of indium oxide ($In_2O_3$). An electrolyte membrane having the weight ratio S/T of 0.9 and the thickness of 151 μm was obtained by using the proton conductive inorganic material thus prepared, which consisted essentially of the indium oxide carrier supporting the molybdenum oxide particles.

Example 10

A proton conductive inorganic material consisting essentially of an indium oxide carrier supporting the tungsten oxide particles and having the element ratio X/Y as shown in Table 1 was obtained as in Example 5, except that 6 g of gallium oxide used in Example 5 was replaced by 9 g of indium oxide ($In_2O_3$). An electrolyte membrane having the weight ratio S/T of 0.9 and the thickness of 150 μm was obtained by using the proton conductive inorganic material thus obtained, which consisted essentially of the indium oxide carrier supporting the tungsten oxide particles.

Example 11

A proton conductive inorganic material consisting essentially of a germanium oxide carrier supporting the boron oxide particles and having the element ratio X/Y as shown in Table 1 was obtained as in Example 1, except that 6 g of gallium oxide used in Example 1 was replaced by 6.5 g of germanium oxide ($GeO_2$). An electrolyte membrane having the weight ratio S/T of 0.9 and the thickness of 149 μm was obtained by using the proton conductive inorganic material thus prepared, which consisted essentially of the germanium oxide carrier supporting the boron oxide particles.

Example 12

A proton conductive inorganic material consisting essentially of a germanium oxide carrier supporting the vanadium oxide particles and having the element ratio X/Y as shown in Table 1 was obtained as in Example 2, except that 6 g of gallium oxide used in Example 2 was replaced by 6.5 g of germanium oxide ($GeO_2$). An electrolyte membrane having the weight ratio S/T of 0.9 and the thickness of 148 μm was obtained by using the proton conductive inorganic material thus prepared, which consisted essentially of the germanium oxide carrier supporting the vanadium oxide particles.

Example 13

A proton conductive inorganic material consisting essentially of a germanium oxide carrier supporting the chromium oxide particles and having the element ratio X/Y as shown in Table 1 was obtained as in Example 3, except that 6 g of gallium oxide used in Example 3 was replaced by 6.5 g of germanium oxide ($GeO_2$). An electrolyte membrane having the weight ratio S/T of 0.9 and the thickness of 150 μm was obtained by using the proton conductive inorganic material thus prepared, which consisted essentially of the germanium oxide carrier supporting the chromium oxide particles.

Example 14

A proton conductive inorganic material consisting essentially of a germanium oxide carrier supporting the molybdenum oxide particles and having the element ratio X/Y as shown in Table 1 was obtained as in Example 4, except that 6 g of gallium oxide used in Example 4 was replaced by 6.5 g of germanium oxide ($GeO_2$). An electrolyte membrane having the weight ratio S/T of 0.9 and the thickness of 152 μm was obtained by using the proton conductive inorganic material thus prepared, which consisted essentially of the germanium oxide carrier supporting the molybdenum oxide particles.

Example 15

A proton conductive inorganic material consisting essentially of a germanium oxide carrier supporting the tungsten oxide particles and having the element ratio X/Y as shown in Table 1 was obtained as in Example 5, except that 6 g of gallium oxide used in Example 5 was replaced by 6:5 g of germanium oxide ($GeO_2$). An electrolyte membrane having the weight ratio S/T of 0.9 and the thickness of 155 μm was obtained by using the proton conductive inorganic material consisting essentially of the germanium oxide carrier supporting the tungsten oxide thus prepared.

Example 16

A proton conductive inorganic material consisting essentially of a niobium oxide carrier supporting the boron oxide particles and having the element ratio X/Y as shown in Table 1 was obtained as in Example 1, except that 6 g of gallium oxide used in Example 1 was replaced by 8 g of niobium oxide ($Nb_2O_5$). An electrolyte membrane having the weight ratio S/T of 0.9 and the thickness of 150 μm was obtained by using the proton conductive inorganic material consisting essentially of the niobium oxide carrier supporting the boron oxide particles thus prepared.

Example 17

A proton conductive inorganic material consisting essentially of a niobium oxide carrier supporting the vanadium oxide particles and having the element ratio X/Y as shown in Table 1 was obtained as in Example 2, except that 6 g of gallium oxide used in Example 2 was replaced by 8 g of niobium oxide ($Nb_2O_5$). An electrolyte membrane having the weight ratio S/T of 0.9 and the thickness of 151 μm was obtained by using the proton conductive inorganic material consisting essentially of the niobium oxide carrier supporting the vanadium oxide particles thus prepared.

Example 18

A proton conductive inorganic material consisting essentially of a niobium oxide carrier supporting the chromium oxide particles and having the element ratio X/Y as shown in Table 1 was obtained as in Example 3, except that 6 g of gallium oxide used in Example 3 was replaced by 8 g of niobium oxide ($Nb_2O_5$). An electrolyte membrane having the weight ratio S/T of 0.9 and the thickness of 152 μm was obtained by using the proton conductive inorganic material consisting essentially of the niobium oxide carrier supporting the chromium oxide particles thus prepared.

Example 19

A proton conductive inorganic material consisting essentially of a niobium oxide carrier supporting the molybdenum oxide particles and having the element ratio X/Y as shown in Table 1 was obtained as in Example 4, except that 6 g of gallium oxide used in Example 4 was replaced by 8 g of niobium oxide ($Nb_2O_5$). An electrolyte membrane having the weight ratio S/T of 0.9 and the thickness of 154 μm was obtained by using the proton conductive inorganic material consisting essentially of the niobium oxide carrier supporting the molybdenum oxide particles thus prepared.

Example 20

A proton conductive inorganic material consisting essentially of a niobium oxide carrier supporting the tungsten oxide particles and having the element ratio X/Y as shown in Table 1 was obtained as in Example 5, except that 6 g of gallium oxide used in Example 5 was replaced by 8 g of niobium oxide ($Nb_2O_5$). An electrolyte membrane having the weight ratio S/T of 0.9 and the thickness of 151 μm was obtained by using the niobium oxide carrier supporting the tungsten oxide particles thus prepared.

Example 21

A proton conductive inorganic material consisting essentially of a hafnium oxide carrier supporting the boron oxide particles and having the element ratio X/Y as shown in Table 2 was obtained as in Example 1, except that 6 g of gallium oxide used in Example 1 was replaced by 13 g of hafnium oxide ($HfO_2$). An electrolyte membrane having the weight ratio S/T of 0.9 and the thickness of 153 μm was obtained by using the proton conductive inorganic material consisting essentially of the hafnium oxide carrier supporting the boron oxide particles thus prepared.

Example 22

A proton conductive inorganic material consisting essentially of a hafnium oxide carrier supporting the vanadium oxide particles and having the element ratio X/Y as shown in Table 2 was obtained as in Example 2, except that 6 g of gallium oxide used in Example 2 was replaced by 13 g of hafnium oxide ($HfO_2$). An electrolyte membrane having the weight ratio S/T of 0.9 and the thickness of 152 μm was obtained by using the proton conductive inorganic material consisting essentially of the hafnium oxide carrier supporting the vanadium oxide particles thus prepared.

Example 23

A proton conductive inorganic material consisting essentially of a hafnium oxide carrier supporting the chromium oxide particles and having the element ratio X/Y as shown in Table 2 was obtained as in Example 3, except that 6 g of gallium oxide used in Example 3 was replaced by 13 g of hafnium oxide ($HfO_2$). An electrolyte membrane having the weight ratio S/T of 0.9 and the thickness of 150 μm was obtained by using the proton conductive inorganic material consisting essentially of the hafnium oxide carrier supporting the chromium oxide particles thus prepared.

Example 24

A proton conductive inorganic material consisting essentially of a hafnium oxide carrier supporting the molybdenum oxide particles and having the element ratio X/Y as shown in Table 2 was obtained as in Example 4, except that 6 g of gallium oxide used in Example 4 was replaced by 13 g of hafnium oxide ($HfO_2$). An electrolyte membrane having the weight ratio S/T of 0.9 and the thickness of 155 μm was obtained by using the proton conductive inorganic material consisting essentially of the hafnium oxide carrier supporting the molybdenum oxide particles thus prepared.

Example 25

A proton conductive inorganic material consisting essentially of a hafnium oxide carrier supporting the tungsten oxide particles and having the element ratio X/Y as shown in Table 2 was obtained as in Example 5, except that 6 g of gallium oxide used in Example 5 was replaced by 13 g of hafnium oxide ($HfO_2$). An electrolyte membrane having the weight ratio S/T of 0.9 and the thickness of 150 μm was obtained by using the proton conductive inorganic material consisting essentially of the hafnium oxide carrier supporting the tungsten oxide particles thus prepared.

Example 26

A proton conductive inorganic material consisting essentially of a cerium oxide carrier supporting the boron oxide particles and having the element ratio X/Y as shown in Table 2 was obtained as in Example 1, except that 6 g of gallium oxide used in Example 1 was replaced by 11 g of cerium oxide ($CeO_2$). An electrolyte membrane having the weight ratio S/T of 0.9 and the thickness of 153 μm was obtained by using the proton conductive inorganic material consisting essentially of the cerium oxide carrier supporting the boron oxide particles thus prepared.

Example 27

A proton conductive inorganic material consisting essentially of a cerium oxide carrier supporting the vanadium oxide particles and having the element ratio X/Y as shown in Table 2 was obtained as in Example 2, except that 6 g of gallium oxide used in Example 2 was replaced by 11 g of cerium oxide ($CeO_2$). An electrolyte membrane having the weight ratio S/T of 0.9 and the thickness of 151 μm was obtained by using the proton conductive inorganic material consisting essentially of the cerium oxide carrier supporting the vanadium oxide particles thus prepared.

Example 28

A proton conductive inorganic material consisting essentially of a cerium oxide carrier supporting the chromium oxide particles and having the element ratio X/Y as shown in Table 2 was obtained as in Example 3, except that 6 g of gallium oxide used in Example 3 was replaced by 11 g of cerium oxide ($CeO_2$). An electrolyte membrane having the weight ratio S/T of 0.9 and the thickness of 154 μm was obtained by using the proton conductive inorganic material consisting essentially of the cerium oxide carrier supporting the chromium oxide particles thus prepared.

Example 29

A proton conductive inorganic material consisting essentially of a cerium oxide carrier supporting the molybdenum oxide particles and having the element ratio X/Y as shown in Table 2 was obtained as in Example 4, except that 6 g of gallium oxide used in Example 4 was replaced by 11 g of cerium oxide ($CeO_2$). An electrolyte membrane having the weight ratio S/T of 0.9 and the thickness of 152 μm was obtained by using the proton conductive inorganic material consisting essentially of the cerium oxide carrier supporting the molybdenum oxide particles thus prepared.

Example 30

A proton conductive inorganic material consisting essentially of a cerium oxide carrier supporting the tungsten oxide particles and having the element ratio X/Y as shown in Table 2 was obtained as in Example 5, except that 6 g of gallium oxide used in Example 5 was replaced by 11 g of cerium oxide ($CeO_2$). An electrolyte membrane having the weight ratio S/T of 0.9 and the thickness of 150 μm was obtained by using the proton conductive inorganic material consisting essentially of the cerium oxide carrier supporting the tungsten oxide particles thus prepared.

Example 31

A proton conductive inorganic material consisting essentially of a tin oxide carrier supporting the boron oxide particles and having the element ratio X/Y as shown in Table 2 was obtained as in Example 1, except that 6 g of gallium oxide used in Example 1 was replaced by 9.5 g of tin oxide ($SnO_2$). An electrolyte membrane having the weight ratio S/T of 0.9 and the thickness of 152 μm was obtained by using the proton conductive inorganic material consisting essentially of the tin oxide carrier supporting the boron oxide particles thus prepared.

Example 32

A proton conductive inorganic material consisting essentially of a tin oxide carrier supporting the vanadium oxide particles and having the element ratio X/Y as shown in Table 2 was obtained as in Example 2, except that 6 g of gallium oxide used in Example 2 was replaced by 9.5 g of tin oxide ($SnO_2$). An electrolyte membrane having the weight ratio S/T of 0.9 and the thickness of 153 μm was obtained by using the proton conductive inorganic material consisting essentially of the tin oxide carrier supporting the vanadium oxide particles thus prepared.

Example 33

A proton conductive inorganic material consisting essentially of a tin oxide carrier supporting the chromium oxide particles and having the element ratio X/Y as shown in Table 2 was obtained as in Example 3, except that 6 g of gallium oxide used in Example 3 was replaced by 9.5 g of tin oxide ($SnO_2$). An electrolyte membrane having the weight ratio S/T of 0.9 and the thickness of 152 μm was obtained by using the proton conductive inorganic material consisting essentially of the tin oxide carrier supporting the chromium oxide particles thus prepared.

Example 34

A proton conductive inorganic material consisting essentially of a tin oxide carrier supporting the molybdenum oxide particles and having the element ratio X/Y as shown in Table 2 was obtained as in Example 4, except that 6 g of gallium oxide used in Example 4 was replaced by 9.5 g of tin oxide ($SnO_2$). An electrolyte membrane having the weight ratio S/T of 0.9 and the thickness of 153 μm was obtained by using the proton conductive inorganic material consisting essentially of the tin oxide carrier supporting the molybdenum oxide particles thus prepared.

Example 35

A proton conductive inorganic material consisting essentially of a tin oxide carrier supporting the tungsten oxide particles and having the element ratio X/Y as shown in Table 2 was obtained as in Example 5, except that 6 g of gallium oxide used in Example 5 was replaced by 9.5 g of tin oxide ($SnO_2$). An electrolyte membrane having the weight ratio S/T of 0.9 and the thickness of 151 μm was obtained by using the proton conductive inorganic material consisting essentially of the tin oxide carrier supporting the tungsten oxide particles thus prepared.

Example 36

An electrolyte membrane having the weight ratio S/T of 0.9 and the thickness of 151 μm was obtained as in Example 17, except that the DMAc solution containing 5% of PAN, which was used in Example 17, was replaced by a DMAc solution containing 5% of polybenzimidazole (PBI).

Example 37

An electrolyte membrane having the weight ratio S/T of 0.9 and the thickness of 152 μm was obtained as in Example 17, except that the DMAc solution containing 5% of PAN, which was used in Example 17, was replaced by a toluene solution containing 5% of polystyrene (PS).

Comparative Example 1

A NAFION 117 membrane (registered trade mark of Dupont Inc.) was prepared as an electrolyte membrane.

Comparative Example 2

2 g of a powdery tungsten oxide $WO_3$ and 5 g of a powdery silicon oxide $SiO_2$ were sufficiently mixed in an agate mortar so as to obtain an oxide mixture consisting of tungsten oxide and silicon oxide, said oxide mixture having an element ratio W/Si of 0.1 of the tungsten element W to the silicon element Si.

One g of the powdery oxide mixture was added to 2 g of a solution of N,N-dimethyl acetamide (DMAc) containing 5% of polyacrylonitrile (PAN), followed by stirring the resultant system at room temperature for 10 minutes so as to prepare a slurry. The slurry thus prepared was put in a petri dish made of a tetrafluoro ethylene-perfluoro alkoxy vinyl ether copolymer (PFA) resin, and the slurry was dried at 60° C. under an air atmosphere so as to obtain an electrolyte membrane. The electrolyte membrane was found to have a weight ratio S/T of 0.9 and a thickness of 152 μm.

When water was added, the electrolyte membrane (proton conductive membrane) obtained in each of Examples 1 to 37 was slightly swollen so as to make it possible to peel off easily the electrolyte membrane from the petri dish made of the PFA resin. The membrane was found to be flexible. Also, the electrolyte membrane was found to exhibit a solid super acidity, when examined with an acidity indicator including m-nitro toluene (pKa=−11.99), p-nitro fluorobenzene (pKa=−12.40), p-nitro chlorobenzene (pKa=−12.70), m-nitro chlorobenzene (pKa=−13.16), 2,4-dinitro toluene (pKa=−13.75), 2,4-dinitro fluorobenzene (pKa=−14.52), and 1,3,5-trinitro benzene (pKa=−16.04). Where an oxide super acid is colored, it is difficult to evaluate the solid acidity from the change in color of the acidity indicator. In such a case, it is possible to measure the solid super acidity by employing a temperature programmed desorption method (TPD method) using ammonia. In this method, an ammonia gas is adsorbed on a solid super acid sample, and the sample temperature is elevated so as to detect the desorbed amount and the desorbing temperature of ammonia from the sample so as to analyze the solid super acidity. Tables 1 and 2 show the acidity function $H_0$ of Hammett for each of the electrolyte membranes.

On the other hand, the electrolyte membrane for each of Comparative Examples 1 and 2 required a larger amount of water for the swelling of the electrolyte membrane, compared with the electrolyte membrane for each of Examples 1 to 37. Also, the electrolyte membrane for each of Comparative Examples 1 and 2 did not exhibit a solid super acidity.

A liquid fuel cell was assembled by the method described in the following by using the electrolyte membrane (proton conductive membrane) obtained in each of Examples 1 to 37 and Comparative Examples 1 to 2.

Specifically, the oxidizing agent electrode 3 was prepared by impregnating an electrode containing a cathode catalyst supporting platinum with a 5% NAFION (registered trade mark of Dupont Inc.) solution, said catalyst, which was manufactured by E-tek Inc., containing 4 mg/cm² of the catalyst Pt. Also, the fuel electrode 2 was prepared by impregnating an electrode containing an anode catalyst supporting both platinum and ruthenium with a 5% NAFION solution, said catalyst, which was manufactured by E-tek Inc., containing 4 mg/cm² of a Pt—Ru catalyst.

Further, the membrane electrode assembly 5 was prepared by arranging the electrolyte membrane 4 (proton conductive membrane) between the fuel electrode 2 and the oxidizing agent electrode 3, followed by applying a hot-press to the resultant structure at 120° C. for 5 minutes under the pressure of 100 kg/cm².

Figure 2:
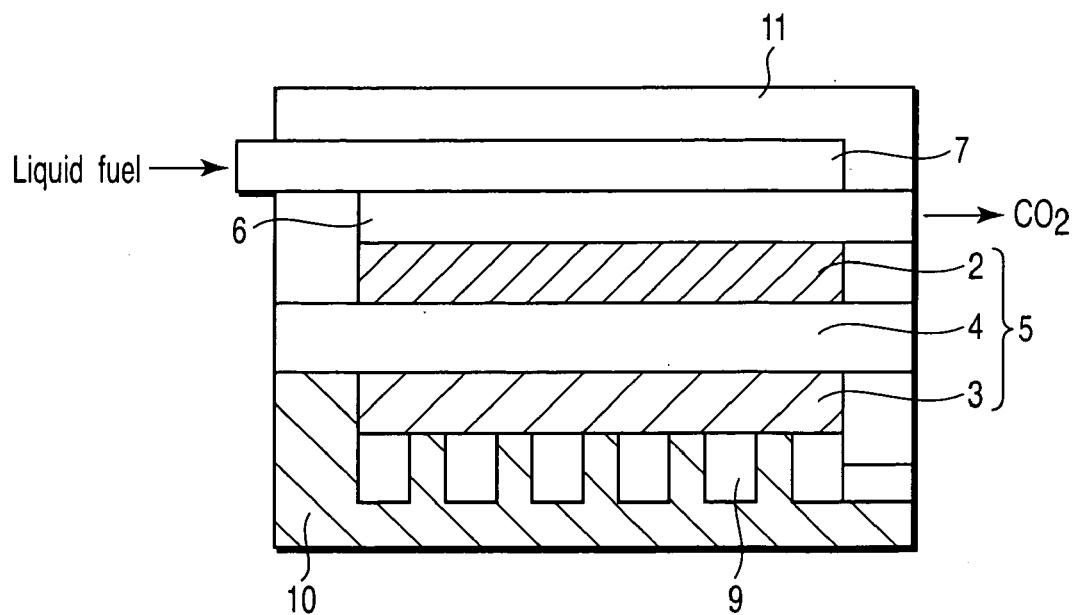
FIG. 2 is a cross sectional view schematically showing the construction of another fuel cell according to the sixth embodiment of the present invention.

Further, a porous carbon plate having an average pore diameter of 100 μm and a porosity of 70% was laminated as the fuel evaporating section 6 on the fuel electrode 2 included in the membrane electrode assembly thus obtained. Also, a porous carbon plate having an average pore diameter of 5 μm and a porosity of 40% was arranged as the fuel permeating section 7 on the fuel evaporating section 6. The resultant structure was arranged within the space defined between an oxidizing agent electrode holder 10 equipped with an oxidizing agent gas supply channel 9 and a fuel electrode holder 11 so as to manufacture a unit cell constructed as shown in FIG. 2. The reaction area of the unit cell thus manufactured was found to be 10 cm². Incidentally, the oxidizing agent gas supply channel 9 formed in the oxidizing agent electrode holder 10 had a depth of 2 mm and a width of 1 mm.

A 20% methanol aqueous solution used as a liquid fuel was introduced by utilizing the capillary action into the side surface of the fuel permeating section 7, as shown in FIG. 2. On the other hand, the air of 1 atm used as an oxidizing agent gas was supplied into the gas channel 9 at the flow rate of 100 mL/min so as to perform the power generation. The carbon dioxide gas ($CO_2$) accompanying the power generating reaction was released to the outside from the fuel evaporating section 6, as shown in FIG. 2. Tables 1 and 2 show the experimental data on the maximum power generation amount.

Tables 1 and 2 also show the results of the measurement of the methanol permeability and the membrane resistance in respect of each of the electrolyte membranes (proton conductive membranes). Each of the methanol permeability and the membrane resistance is given in Tables 1 and 2 by relative values, with the value of the NAFION 117 membrane for Comparative Example 1 set as 1.

Incidentally, for measuring the methanol permeability, the electrolyte membrane was inserted into the cell having an area of 10 cm² so as to divide the cell into two cell sections. A 10% methanol aqueous solution was put in one of the two cell sections and a pure water was put in the other cell section. Under this condition, the methanol concentration in the cell section housing the pure water was measured by the gas chromatography at room temperature a prescribed time later so as to measure the methanol permeability of the electrolyte membrane. The electrolyte membrane was kept immersed in water for 16 hours so as to make the electrolyte membrane ready for use as the electrolyte membrane, and the methanol permeability of the electrolyte membrane was measured after the water was drained from the electrolyte membrane.

Also, the electric resistance of the electrolyte membrane was measured by the four terminal DC method. Specifically, an electrolyte membrane was inserted into a cell having an area of 10 cm² so as to divide the cell into two cell sections. A 10% sulfuric acid aqueous solution was put in each of these two cell sections, and a DC current was allowed to flow through the cell so as to measure the voltage drop caused by the presence of the electrolyte membrane, thereby measuring the conductivity of the electrolyte membrane.

TABLE 1

| | Element X of oxide B | Oxide A containing element Y | Element ratio (X/Y) | Specific surface area (m²/g) | Acidity function $H_0$ | Organic polymer material | Relative methanol permeability | Relative membrane resistance | Maximum power generation amount during use of 20% methanol (mW/cm²) |
|---|---|---|---|---|---|---|---|---|---|
| Example 1 | B | $Ga_2O_3$ | 0.1 | 54 | −11.99 | PAN | 0.69 | 1.76 | 8.3 |
| Example 2 | V | $Ga_2O_3$ | 0.1 | 50 | −11.99 | PAN | 0.68 | 1.73 | 8.5 |
| Example 3 | Cr | $Ga_2O_3$ | 0.1 | 52 | −11.99 | PAN | 0.66 | 1.72 | 8.7 |
| Example 4 | Mo | $Ga_2O_3$ | 0.1 | 50 | −12.40 | PAN | 0.64 | 1.69 | 9.0 |

TABLE 1-continued

|  | Element X of oxide B | Oxide A containing element Y | Element ratio (X/Y) | Specific surface area (m²/g) | Acidity function $H_0$ | Organic polymer material | Relative methanol permeability | Relative membrane resistance | Maximum power generation amount during use of 20% methanol (mW/cm²) |
|---|---|---|---|---|---|---|---|---|---|
| Example 5 | W | Ga₂O₃ | 0.1 | 50 | −12.40 | PAN | 0.63 | 1.67 | 9.4 |
| Example 6 | B | In₂O₃ | 0.1 | 55 | −12.40 | PAN | 0.61 | 1.64 | 9.9 |
| Example 7 | V | In₂O₃ | 0.1 | 53 | −12.40 | PAN | 0.59 | 1.63 | 10.2 |
| Example 8 | Cr | In₂O₃ | 0.1 | 49 | −12.40 | PAN | 0.58 | 1.61 | 10.5 |
| Example 9 | Mo | In₂O₃ | 0.1 | 55 | −12.70 | PAN | 0.56 | 1.60 | 10.8 |
| Example 10 | W | In₂O₃ | 0.1 | 49 | −12.70 | PAN | 0.55 | 1.58 | 11.2 |
| Example 11 | B | GeO₂ | 0.1 | 50 | −12.70 | PAN | 0.53 | 1.56 | 11.4 |
| Example 12 | V | GeO₂ | 0.1 | 50 | −12.70 | PAN | 0.51 | 1.55 | 12.2 |
| Example 13 | Cr | GeO₂ | 0.1 | 54 | −12.70 | PAN | 0.49 | 1.54 | 12.6 |
| Example 14 | Mo | GeO₂ | 0.1 | 53 | −13.16 | PAN | 0.47 | 1.52 | 13.5 |
| Example 15 | W | GeO₂ | 0.1 | 50 | −13.16 | PAN | 0.46 | 1.50 | 13.6 |
| Example 16 | B | Nb₂O₅ | 0.1 | 51 | −13.16 | PAN | 0.45 | 1.49 | 14.5 |
| Example 17 | V | Nb₂O₅ | 0.1 | 53 | −13.16 | PAN | 0.43 | 1.47 | 14.8 |
| Example 18 | Cr | Nb₂O₅ | 0.1 | 52 | −13.16 | PAN | 0.42 | 1.45 | 15.3 |
| Example 19 | Mo | Nb₂O₅ | 0.1 | 55 | −13.75 | PAN | 0.40 | 1.43 | 15.9 |
| Example 20 | W | Nb₂O₅ | 0.1 | 54 | −13.75 | PAN | 0.39 | 1.40 | 16.9 |

TABLE 2

|  | Element X of oxide B | Oxide A containing element Y | Element ratio (X/Y) | Specific surface area (m²/g) | Acidity function $H_0$ | Organic polymer material | Relative methanol permeability | Relative membrane resistance | Maximum power generation amount during use of 20% methanol (mW/cm²) |
|---|---|---|---|---|---|---|---|---|---|
| Example 21 | B | HfO₂ | 0.1 | 52 | −13.75 | PAN | 0.38 | 1.37 | 18.0 |
| Example 22 | V | HfO₂ | 0.1 | 51 | −13.75 | PAN | 0.36 | 1.35 | 19.3 |
| Example 23 | Cr | HfO₂ | 0.1 | 54 | −13.75 | PAN | 0.34 | 1.32 | 20.5 |
| Example 24 | Mo | HfO₂ | 0.1 | 50 | −14.52 | PAN | 0.32 | 1.27 | 21.7 |
| Example 25 | W | HfO₂ | 0.1 | 52 | −14.52 | PAN | 0.31 | 1.24 | 22.6 |
| Example 26 | B | CeO₂ | 0.1 | 52 | −14.52 | PAN | 0.28 | 1.21 | 22.9 |
| Example 27 | V | CeO₂ | 0.1 | 53 | −14.52 | PAN | 0.25 | 1.19 | 23.4 |
| Example 28 | Cr | CeO₂ | 0.1 | 50 | −14.52 | PAN | 0.23 | 1.15 | 23.9 |
| Example 29 | Mo | CeO₂ | 0.1 | 51 | −15.00 | PAN | 0.22 | 1.13 | 24.6 |
| Example 30 | W | CeO₂ | 0.1 | 53 | −15.00 | PAN | 0.20 | 1.08 | 24.8 |
| Example 31 | B | SnO₂ | 0.1 | 55 | −15.00 | PAN | 0.19 | 1.04 | 25.5 |
| Example 32 | V | SnO₂ | 0.1 | 55 | −15.00 | PAN | 0.16 | 1.02 | 25.7 |
| Example 33 | Cr | SnO₂ | 0.1 | 50 | −15.00 | PAN | 0.15 | 0.99 | 26.3 |
| Example 34 | Mo | SnO₂ | 0.1 | 54 | −16.04 | PAN | 0.13 | 0.97 | 28.8 |
| Example 35 | W | SnO₂ | 0.1 | 51 | −16.04 | PAN | 0.11 | 0.96 | 30.4 |
| Example 36 | V | Nb₂O₅ | 0.1 | 53 | −13.16 | PBI | 0.39 | 1.50 | 13.1 |
| Example 37 | V | Nb₂O₅ | 0.1 | 53 | −13.16 | PS | 0.35 | 1.53 | 13.3 |
| Comparative Example 1 | — | — | — | — | — | — | 1.0 | 1.0 | 2.0 |
| Comparative Example 2 | WO₃ | SiO₂ | — | 50 | — | PAN | 3.0 | 6.0 | 0.05 |

As apparent from Tables 1 and 2, the methanol permeability of the electrolyte membrane for each of Examples 1 to 37 was found to be markedly lower than that of the electrolyte membrane for each of Comparative Examples 1 and 2, and the membrane resistance of the electrolyte membrane for each of Examples 1 to 37 was found to be slightly higher that that of the electrolyte membrane for Comparative Example 1.

As apparent from the experimental data for Comparative Example 1 given in Table 2, in the case of using a 20% methanol aqueous solution, the cross-over was excessively large in the fuel cell comprising the NAFION 117 membrane as the electrolyte membrane, with the result that the maximum power generation amount was only 2 mW/cm². On the other hand, in the fuel cell comprising the electrolyte membrane for each of Examples 1 to 37 as the electrolyte membrane, it was possible to suppress the cross-over of methanol so as to obtain a satisfactory power generation amount. The power generation amount was found to be particularly large in the fuel cell using the electrolyte membrane for each of Examples 31 to 35, in which SnO₂ was used as the oxide carrier. The largest power generation amount was obtained in the fuel cell for Example 35, in which the tungsten oxide particles were supported on the SnO₂ carrier.

Also, as apparent from the experimental data for Comparative Example 2 given in Table 2, in the fuel cell comprising the electrolyte membrane, in which an oxide mixture consisting of tungsten oxide and silicon oxide was used as the proton conductor, the oxide did not perform the proton conductive function, with the result that the membrane resistance was markedly increased and, thus, power was scarcely generated.

A 20% methanol aqueous solution was supplied as a fuel into a unit cell in which the proton conductive membrane for each of Examples 1 to 37 was used as the electrolyte membrane, and air was also supplied into the unit cell. Under this condition, the both surfaces of the unit cell were heated to 40° C. so as to output the current of 10 mA/cm², thereby observing stability with time. The output of the unit cell was found to be stable even several hours later. Further, a similar measurement was performed at 150° C., with the result that the output of the unit cell was found to be stable even several hours later.

A 20% methanol aqueous solution was supplied as a liquid fuel into the fuel cell comprising the NAFION 117 membrane (Comparative Example 1), and air was also supplied into the fuel cell. Under this condition, the both surfaces of the cell were heated to 40° C. so as to output a current of 10 mA/cm$^2$, thereby observing stability with time. It was found impossible to output the current only several minutes later. Further, a similar measurement was performed at 150° C., with the result that the electrolyte membrane was dried because it was impossible to control strictly the moisture content of the electrolyte membrane. Such being the situation, it was impossible to obtain the output.

Example 38

A proton conductive inorganic material consisting essentially of magnesium oxide-added zirconia carrier supporting the molybdenum oxide particles, having the element ratio as shown in Table 3 and also having a specific surface area of 51 m$^2$/g was obtained as in Example 4, except that 6 g of gallium oxide used in Example 4 was replaced by 7.8 g of magnesium oxide-added zirconia (11 mol % MgO-89 mol % $ZrO_2$) and that the baking temperature was changed from 700° C. to 850° C. An electrolyte membrane having the weight ratio S/T of 0.9 and the thickness of 153 µm was obtained by using the proton conductive inorganic material thus prepared.

Incidentally, the element ratio X/Y given in Table 3 denotes the ratio of the element X (e.g., molybdenum) to the element Y (e.g., zirconium). Also, the element ratio (Z/X+Y+Z) denotes the molar amount of the element Z on the basis that the total molar amount of the element X, the element Y and the element Z (e.g., magnesium) was set at 100 mol %. To be more specific, where the element ratio (Z/X+Y+Z) is, for example, 0.1, the molar amount of the element Z is 10 mol %.

Example 39

A proton conductive inorganic material consisting essentially of calcium oxide-added zirconia carrier supporting the molybdenum oxide particles, having the element ratio as shown in Table 3 and also having a specific surface area of 53 m$^2$/g was obtained as in Example 4, except that 6 g of gallium oxide used in Example 4 was replaced by 7.9 g of calcium oxide-added zirconia (11 mol % CaO-89 mol % $ZrO_2$) and that the baking temperature was changed from 700° C. to 850° C. An electrolyte membrane having the weight ratio S/T of 0.9 and the thickness of 153 µm was obtained by using the proton conductive inorganic material thus prepared.

Example 40

A proton conductive inorganic material consisting essentially of strontium oxide-added zirconia carrier supporting the molybdenum oxide particles, having the element ratio as shown in Table 3 and also having a specific surface area of 52 m$^2$/g was obtained as in Example 4, except that 6 g of gallium oxide used in Example 4 was replaced by 8.3 g of strontium oxide-added zirconia (11 mol % SrO-89 mol % $ZrO_2$) and that the baking temperature was changed from 700° C. to 850° C. An electrolyte membrane having the weight ratio S/T of 0.9 and the thickness of 151 µm was obtained by using the proton conductive inorganic material thus prepared.

Example 41

A proton conductive inorganic material consisting essentially of barium oxide-added zirconia carrier supporting the molybdenum oxide particles, having the element ratio as shown in Table 3 and also having a specific surface area of 55 m$^2$/g was obtained as in Example 4, except that 6 g of gallium oxide used in Example 4 was replaced by 8.7 g of barium oxide-added zirconia (11 mol % BaO-89 mol % $ZrO_2$) and that the baking temperature was changed from 700° C. to 850° C. An electrolyte membrane having the weight ratio S/T of 0.9 and the thickness of 152 µm was obtained by using the proton conductive inorganic material thus prepared.

Example 42

A proton conductive inorganic material consisting essentially of scandium oxide-added zirconia carrier supporting the molybdenum oxide particles, having the element ratio as shown in Table 3 and also having a specific surface area of 52 m$^2$/g was obtained as in Example 4, except that 6 g of gallium oxide used in Example 4 was replaced by 8.25 g of scandium oxide-added zirconia (8 mol % $Sc_2O_3$-92 mol % $ZrO_2$) and that the baking temperature was changed from 700° C. to 850° C. An electrolyte membrane having the weight ratio S/T of 0.9 and the thickness of 154 µm was obtained by using the proton conductive inorganic material thus prepared.

Example 43

A proton conductive inorganic material consisting essentially of yttrium oxide-added zirconia carrier supporting the molybdenum oxide particles, having the element ratio as shown in Table 3 and also having a specific surface area of 53 m$^2$/g was obtained as in Example 4, except that 6 g of gallium oxide used in Example 4 was replaced by 8.7 g of yttrium oxide-added zirconia (8 mol % $Y_2O_3$-92 mol % $ZrO_2$) and that the baking temperature was changed from 700° C. to 850° C. An electrolyte membrane having the weight ratio S/T of 0.9 and the thickness of 151 µm was obtained by using the proton conductive inorganic material thus prepared.

Example 44

A proton conductive inorganic material consisting essentially of lanthanum oxide-added zirconia carrier supporting the molybdenum oxide particles, having the element ratio as shown in Table 3 and also having a specific surface area of 51 m$^2$/g was obtained as in Example 4, except that 6 g of gallium oxide used in Example 4 was replaced by 9.25 g of lanthanum oxide-added zirconia (8 mol % $La_2O_3$-92 mol % $ZrO_2$) and that the baking temperature was changed from 700° C. to 850° C. An electrolyte membrane having the weight ratio S/T of 0.9 and the thickness of 153 µm was obtained by using the proton conductive inorganic material thus prepared.

Example 45

A proton conductive inorganic material consisting essentially of samarium oxide-added ceria carrier supporting the molybdenum oxide particles, having the element ratio as shown in Table 3 and also having a specific surface area of 52 m$^2$/g was obtained as in Example 4, except that 6 g of gallium oxide used in Example 4 was replaced by 13.5 g of samarium oxide-added ceria (10 mol % $Sm_2O_3$-90 mol % $CeO_2$) and that the baking temperature was changed from 700° C. to 850° C. An electrolyte membrane having the weight ratio S/T of 0.9 and the thickness of 152 μm was obtained by using the proton conductive inorganic material thus prepared.

Example 46

A proton conductive inorganic material consisting essentially of gadolinium oxide-added ceria carrier supporting the molybdenum oxide particles, having the element ratio as shown in Table 3 and also having a specific surface area of 54 $m^2/g$ was obtained as in Example 4, except that 6 g of gallium oxide used in Example 4 was replaced by 13.6 g of gadolinium oxide-added ceria (10 mol % $Gd_2O_3$-90 mol % $CeO_2$) and that the baking temperature was changed from 700° C. to 850° C. An electrolyte membrane having the weight ratio S/T of 0.9 and the thickness of 154 μm was obtained by using the proton conductive inorganic material thus prepared.

Comparative Example 3

A proton conductive inorganic material consisting of the zirconium oxide carrier supporting the molybdenum oxide particles, having the element ratio as shown in Table 3 and also having a specific surface area of 53 $m^2/g$ was obtained as in Example 4, except that 6 g of gallium oxide used in Example 4 was replaced by 7.5 g of zirconium oxide ($ZrO_2$) and that the baking temperature was changed from 700° C. to 850° C. An electrolyte membrane having the weight ratio S/T of 0.9 and the thickness of 150 μm was obtained by using the proton conductive inorganic material thus prepared.

A liquid fuel cell was manufactured as in Example 1 by using the electrolyte membrane obtained in each of Examples 38 to 46 and Comparative Example 3 so as to measure the maximum power generation amount of the fuel cell. Table 3 shows the result.

As shown in Table 3, the electrolyte membrane for each of Examples 38 to 44 was found to have an electric resistance lower than that of the electrolyte membrane for Comparative Example 3 and also found to have the maximum power generation amount larger than that of the electrolyte membrane for Comparative Example 3. The experimental data clearly support that output characteristics of the fuel cell can be further improved by the addition of a third component of element Z.

In Comparative Example 3, the charging composition was controlled to permit the element ratio X/Y to be 0.1. However, the molybdenum oxide was sublimed by the baking at 850° C. so as to lower the element ratio X/Y to 0.08. It is considered reasonable to understand that, since the proton conduction sites of the proton conductive inorganic material were decreased, the membrane resistance was increased so as to lower the power generation amount. It is also considered reasonable to understand that the proton conduction sites of the proton conductive inorganic material were decreased because the bonding strength between the oxide particles and the oxide carrier was insufficient, though the reason for the difficulty has not yet been clarified sufficiently.

On the other hand, the molybdenum oxide particles were not scattered and not released from the oxide carrier in each of Examples 38 to 46, in which the third component was added for preparing the proton conductive inorganic material, so as to obtain the desired composition. It is considered reasonable to understand that the desired composition was obtained because the third component made it possible for the oxide particles to be bonded sufficiently to the oxide carrier. It should also be noted that the acidity of the proton conductive inorganic material was lowered by the addition of the basic oxide. However, since the addition of the basic oxide served to increase the proton conduction sites, the membrane resistance was lowered so as to increase the power generation amount.

TABLE 3

| | Element X of oxide B | Oxide A containing element Y | Oxide C containing element Z and used as an additive | Element ratio (X/Y) | Element ratio (Z/X + Y + Z) | Acidity function $H_0$ | Organic polymer material | Relative methanol permeability | Relative membrane resistance | Maximum power generation amount during use of 20% methanol (mW/cm²) |
|---|---|---|---|---|---|---|---|---|---|---|
| Example 38 | Mo | $ZrO_2$ | MgO | 0.1 | 0.1 (10 mol %) | −13.75 | PAN | 0.22 | 1.30 | 29.2 |
| Example 39 | Mo | $ZrO_2$ | CaO | 0.1 | 0.1 (10 mol %) | −13.75 | PAN | 0.23 | 1.31 | 29.0 |
| Example 40 | Mo | $ZrO_2$ | SrO | 0.1 | 0.1 (10 mol %) | −13.75 | PAN | 0.23 | 1.30 | 29.4 |
| Example 41 | Mo | $ZrO_2$ | BaO | 0.1 | 0.1 (10 mol %) | −13.75 | PAN | 0.22 | 1.31 | 29.2 |
| Example 42 | Mo | $ZrO_2$ | $Sc_2O_3$ | 0.1 | 0.14 (14 mol %) | −13.16 | PAN | 0.23 | 1.34 | 29.3 |
| Example 43 | Mo | $ZrO_2$ | $Y_2O_3$ | 0.1 | 0.14 (14 mol %) | −13.16 | PAN | 0.22 | 1.32 | 29.4 |
| Example 44 | Mo | $ZrO_2$ | $La_2O_3$ | 0.1 | 0.14 (14 mol %) | −13.16 | PAN | 0.23 | 1.35 | 29.5 |
| Example 45 | Mo | $CeO_2$ | $Sm_2O_3$ | 0.1 | 0.17 (17 mol %) | −13.75 | PAN | 0.23 | 1.25 | 29.1 |
| Example 46 | Mo | $CeO_2$ | $Gd_2O_3$ | 0.1 | 0.17 (17 mol %) | −13.75 | PAN | 0.23 | 1.24 | 29.3 |
| Comparative Example 3 | Mo | $ZrO_2$ | — | 0.08 | — | −14.52 | PAN | 0.23 | 1.55 | 19.0 |
| Comparative Example 4 | Mo | $CeO_2$ | — | 0.08 | — | −15.00 | PAN | 0.22 | 1.43 | 19.6 |

Even in the case where the kind of element Y was changed to Ce, which differed from that in Examples 38 to 44, the electrolyte membrane for Examples 45 and 46 having the element Z added thereto made it possible to increase the maximum power generation amount of the fuel cell, compared with the electrolyte membrane for Example 29 having the element Z not added thereto. The experimental data support that the addition of the element Z permits improving the output characteristics of the fuel cell.

Example 47

A slurry was prepared by mixing the proton conductive inorganic material obtained in Example 1, a supported catalyst containing platinum and ruthenium, PAN and DMAc in the mixing ratio by weight of 0.45/0.45/0.1/5.0, followed by coating a carbon cloth sized at 32 mm×32 mm with the resultant slurry so as to manufacture a fuel electrode containing 4 mg/cm$^2$ of the Pt—Ru catalyst.

Also, a slurry was prepared by mixing the proton conductive inorganic material obtained in Example 1, a supported catalyst containing platinum, PAN and DMAc in the mixing ratio by weight of 0.45/0.45/0.1/5.0, followed by coating a carbon cloth sized at 32 mm×32 mm with the resultant slurry so as to manufacture an oxidizing agent electrode containing 4 mg/cm$^2$ of the Pt catalyst.

Further, a NAFION 117 membrane similar to that used in Comparative Example 1 was prepared as an electrolyte membrane.

A fuel cell was manufactured as in Example 1, except that the fuel electrode, the oxidizing agent electrode and the electrolyte membrane noted above were used for manufacturing the fuel cell.

Example 48

A fuel cell was manufactured as in Example 1, except that the fuel electrode and the oxidizing agent electrode obtained in Example 47 and the electrolyte membrane obtained in Example 1 were used for manufacturing the fuel cell.

Comparative Example 4

A platinum-ruthenium catalyst was supported by the proton conductive inorganic material obtained in Example 1. Then, a slurry was prepared by mixing the proton conductive inorganic material supporting the platinum-ruthenium catalyst noted above, carbon, PAN and DMAc in the mixing ratio by weight of 0.45/0.45/0.1/5.0, followed by coating a carbon cloth sized at 32 mm×32 mm with the resultant slurry so as to manufacture a fuel electrode containing 4 mg/cm$^2$ of the Pt—Ru catalyst.

Also, a platinum catalyst was supported by the proton conductive inorganic material obtained in Example 1. Then, a slurry was prepared by mixing the proton conductive inorganic material supporting the platinum catalyst noted above, carbon, PAN and DMAc in the mixing ratio by weight of 0.45/0.45/0.1/5.0, followed by coating a carbon cloth sized at 32 mm×32 mm with the resultant slurry so as to manufacture an oxidizing agent electrode containing 4 mg/cm$^2$ of the Pt catalyst.

Further, a NAFION 117 membrane similar to that used in Comparative Example 1 was prepared as an electrolyte membrane.

A fuel cell was manufactured as in Example 1, except that the fuel electrode, the oxidizing agent electrode and the electrolyte membrane noted above were used for manufacturing the fuel cell.

The cell resistance and the maximum power generation amount of the fuel cell manufactured in each of Examples 47, 48 were measured, with the results as shown in Table 4. Incidentally, the experimental data for Example 1 and Comparative Example 1 described previously are also shown in Table 4.

TABLE 4

|  | Fuel electrode | Electrolyte membrane | Oxidizing agent electrode | Cell resistance (mΩ) | Maximum power generation amount during use of 20% methanol (mW/cm$^2$) |
| --- | --- | --- | --- | --- | --- |
| Example 1 | Organic polymer material containing perfluoro sulfonic acid | Proton conductive inorganic material | Organic polymer material containing perfluoro sulfonic acid | 25 | 8.3 |
| Example 47 | Proton conductive inorganic material | Organic polymer material containing perfluoro sulfonic acid | Proton conductive inorganic material | 28 | 6.2 |
| Example 48 | Proton conductive inorganic material | Proton conductive inorganic material | Proton conductive inorganic material | 21 | 24.1 |
| Comparative Example 1 | Organic polymer material containing perfluoro sulfonic acid | Organic polymer material containing perfluoro sulfonic acid | Organic polymer material containing perfluoro sulfonic acid | 30 | 2.0 |

As apparent from Table 4, the membrane electrode assembly obtained in each of Examples 1, 47 and 48 exhibited output characteristics higher than those exhibited by the membrane electrode assembly obtained in Comparative Example 1. Such prominent effects were obtained from the membrane electrode assembly obtained in the Examples of the present invention because the proton conductive material used for preparing the electrode or the electrolyte membrane in each of the Examples of the present invention was low in resistance so as to lower the cell resistance. Also, Examples 1 and 48 were superior to Example 47 in the output characteristics because the electrolyte membrane obtained in Example 1 was low in the methanol permeability, as shown in Table 1.

In Comparative Example 4, the proton conductive inorganic material supporting the Pt—Ru catalyst or the Pt catalyst was used as the electrode. However, it was impossible for the fuel cell comprising this particular electrode to achieve a satisfactory power generation. The power generated from the fuel cell was very small. It is considered reasonable to understand that it was impossible for the catalyst supported by the proton conductive inorganic material to exhibit a sufficient conductivity so as to increase the electric resistance, with the result that the fuel cell was substantially incapable of generating power.

Example 49

One gram of the proton conductive inorganic material powder manufactured as in Example 1 was added to 2 g of an aqueous solution containing 5% of polyvinyl alcohol (PVA), and the resultant system was kept stirred at room temperature for 10 minutes so as to prepare a slurry. The slurry thus prepared was put in a petri dish made of a tetrafluoro ethylene-perfluoro alkoxy vinyl ether copolymer (PFA) resin, and the slurry was dried by elevating stepwise the temperature to 60° C. and, then, to 150° C. under an air atmosphere so as to obtain an electrolyte membrane. The electrolyte membrane thus obtained was found to have the weight ratio S/T of 0.9 and the thickness of 151 μm.

Example 50

An electrolyte membrane having the weight ratio S/T of 0.9 and the thickness of 152 μm was obtained as in Example 49, except that the proton conductive inorganic material powder prepared as in Example 2 was used for manufacturing the electrolyte membrane.

Example 51

An electrolyte membrane having the weight ratio S/T of 0.9 and the thickness of 151 μm was obtained as in Example 49, except that the proton conductive inorganic material powder prepared as in Example 3 was used for manufacturing the electrolyte membrane.

Example 52

An electrolyte membrane having the weight ratio S/T of 0.9 and the thickness of 155 μm was obtained as in Example 49, except that the proton conductive inorganic material powder prepared as in Example 4 was used for manufacturing the electrolyte membrane.

Example 53

An electrolyte membrane having the weight ratio S/T of 0.9 and the thickness of 151 μm was obtained as in Example 49, except that the proton conductive inorganic material powder prepared as in Example 5 was used for manufacturing the electrolyte membrane.

Example 54

An electrolyte membrane having the weight ratio S/T of 0.9 and the thickness of 152 μm was obtained as in Example 49, except that the proton conductive inorganic material powder prepared as in Example 6 was used for manufacturing the electrolyte membrane.

Example 55

An electrolyte membrane having the weight ratio S/T of 0.9 and the thickness of 153 μm was obtained as in Example 49, except that the proton conductive inorganic material powder prepared as in Example 7 was used for manufacturing the electrolyte membrane.

Example 56

An electrolyte membrane having the weight ratio S/T of 0.9 and the thickness of 152 μm was obtained as in Example 49, except that the proton conductive inorganic material powder prepared as in Example 8 was used for manufacturing the electrolyte membrane.

Example 57

An electrolyte membrane having the weight ratio S/T of 0.9 and the thickness of 152 μm was obtained as in Example 49, except that the proton conductive inorganic material powder prepared as in Example 9 was used for manufacturing the electrolyte membrane.

Example 58

An electrolyte membrane having the weight ratio S/T of 0.9 and the thickness of 151 μm was obtained as in Example 49, except that the proton conductive inorganic material powder prepared as in Example 10 was used for manufacturing the electrolyte membrane.

Example 59

An electrolyte membrane having the weight ratio S/T of 0.9 and the thickness of 152 μm was obtained as in Example 49, except that the proton conductive inorganic material powder prepared as in Example 11 was used for manufacturing the electrolyte membrane.

Example 60

An electrolyte membrane having the weight ratio S/T of 0.9 and the thickness of 151 μm was obtained as in Example 49, except that the proton conductive inorganic material powder prepared as in Example 12 was used for manufacturing the electrolyte membrane.

Example 61

An electrolyte membrane having the weight ratio S/T of 0.9 and the thickness of 150 μm was obtained as in Example 49, except that the proton conductive inorganic material powder prepared as in Example 13 was used for manufacturing the electrolyte membrane.

Example 62

An electrolyte membrane having the weight ratio S/T of 0.9 and the thickness of 151 μm was obtained as in Example 49, except that the proton conductive inorganic material powder prepared as in Example 14 was used for manufacturing the electrolyte membrane.

Example 63

An electrolyte membrane having the weight ratio S/T of 0.9 and the thickness of 153 μm was obtained as in Example 49, except that the proton conductive inorganic material powder prepared as in Example 15 was used for manufacturing the electrolyte membrane.

Example 64

An electrolyte membrane having the weight ratio S/T of 0.9 and the thickness of 154 μm was obtained as in Example 49, except that the proton conductive inorganic material powder prepared as in Example 16 was used for manufacturing the electrolyte membrane.

Example 65

An electrolyte membrane having the weight ratio S/T of 0.9 and the thickness of 152 μm was obtained as in Example 49, except that the proton conductive inorganic material powder prepared as in Example 17 was used for manufacturing the electrolyte membrane.

Example 66

An electrolyte membrane having the weight ratio S/T of 0.9 and the thickness of 153 μm was obtained as in Example 49, except that the proton conductive inorganic material powder prepared as in Example 18 was used for manufacturing the electrolyte membrane.

Example 67

An electrolyte membrane having the weight ratio S/T of 0.9 and the thickness of 154 μm was obtained as in Example 49, except that the proton conductive inorganic material powder prepared as in Example 19 was used for manufacturing the electrolyte membrane.

Example 68

An electrolyte membrane having the weight ratio S/T of 0.9 and the thickness of 152 μm was obtained as in Example 49, except that the proton conductive inorganic material powder prepared as in Example 20 was used for manufacturing the electrolyte membrane.

Example 69

An electrolyte membrane having the weight ratio S/T of 0.9 and the thickness of 151 μm was obtained as in Example 49, except that the proton conductive inorganic material powder prepared as in Example 21 was used for manufacturing the electrolyte membrane.

Example 70

An electrolyte membrane having the weight ratio S/T of 0.9 and the thickness of 153 μm was obtained as in Example 49, except that the proton conductive inorganic material powder prepared as in Example 22 was used for manufacturing the electrolyte membrane.

Example 71

An electrolyte membrane having the weight ratio S/T of 0.9 and the thickness of 152 μm was obtained as in Example 49, except that the proton conductive inorganic material powder prepared as in Example 23 was used for manufacturing the electrolyte membrane.

Example 72

An electrolyte membrane having the weight ratio S/T of 0.9 and the thickness of 154 μm was obtained as in Example 49, except that the proton conductive inorganic material powder prepared as in Example 24 was used for manufacturing the electrolyte membrane.

Example 73

An electrolyte membrane having the weight ratio S/T of 0.9 and the thickness of 152 μm was obtained as in Example 49, except that the proton conductive inorganic material powder prepared as in Example 25 was used for manufacturing the electrolyte membrane.

Example 74

An electrolyte membrane having the weight ratio S/T of 0.9 and the thickness of 151 μm was obtained as in Example 49, except that the proton conductive inorganic material powder prepared as in Example 26 was used for manufacturing the electrolyte membrane.

Example 75

An electrolyte membrane having the weight ratio S/T of 0.9 and the thickness of 153 μm was obtained as in Example 49, except that the proton conductive inorganic material powder prepared as in Example 27 was used for manufacturing the electrolyte membrane.

Example 76

An electrolyte membrane having the weight ratio S/T of 0.9 and the thickness of 152 μm was obtained as in Example 49, except that the proton conductive inorganic material powder prepared as in Example 28 was used for manufacturing the electrolyte membrane.

Example 77

An electrolyte membrane having the weight ratio S/T of 0.9 and the thickness of 151 μm was obtained as in Example 49, except that the proton conductive inorganic material powder prepared as in Example 29 was used for manufacturing the electrolyte membrane.

Example 78

An electrolyte membrane having the weight ratio S/T of 0.9 and the thickness of 150 μm was obtained as in Example 49, except that the proton conductive inorganic material powder prepared as in Example 30 was used for manufacturing the electrolyte membrane.

Example 79

An electrolyte membrane having the weight ratio S/T of 0.9 and the thickness of 154 μm was obtained as in Example 49, except that the proton conductive inorganic material powder prepared as in Example 31 was used for manufacturing the electrolyte membrane.

Example 80

An electrolyte membrane having the weight ratio S/T of 0.9 and the thickness of 155 μm was obtained as in Example 49, except that the proton conductive inorganic material powder prepared as in Example 32 was used for manufacturing the electrolyte membrane.

Example 81

An electrolyte membrane having the weight ratio S/T of 0.9 and the thickness of 153 μm was obtained as in Example 49, except that the proton conductive inorganic material powder prepared as in Example 33 was used for manufacturing the electrolyte membrane.

Example 82

An electrolyte membrane having the weight ratio S/T of 0.9 and the thickness of 154 μm was obtained as in Example 49, except that the proton conductive inorganic material powder prepared as in Example 34 was used for manufacturing the electrolyte membrane.

Example 83

An electrolyte membrane having the weight ratio S/T of 0.9 and the thickness of 151 μm was obtained as in Example 49, except that the proton conductive inorganic material powder prepared as in Example 35 was used for manufacturing the electrolyte membrane.

Example 84

An electrolyte membrane having the weight ratio S/T of 0.9 and the thickness of 150 μm was obtained as in Example 49, except that the proton conductive inorganic material powder prepared as in Example 17 was used for manufacturing the electrolyte membrane, and that 2 g of the 5% PVA aqueous solution used in Example 49 was changed to 2 g of a mixed solution consisting of 1.5 g of a 5% PVA aqueous solution and 0.5 g of a 5% polyacrylic acid (PA) aqueous solution.

Example 85

An electrolyte membrane having the weight ratio S/T of 0.9 and the thickness of 151 μm was obtained as in Example 49, except that the proton conductive inorganic material powder prepared as in Example 17 was used for manufacturing the electrolyte membrane, and that 2 g of the 5% PVA aqueous solution used in Example 49 was changed to 2 g of a 5% polyethylene glycol (PEG) aqueous solution.

Example 86

An electrolyte membrane having the weight ratio S/T of 0.9 and the thickness of 154 μm was obtained as in Example 49, except that the proton conductive inorganic material powder prepared as in Example 17 was used for manufacturing the electrolyte membrane, and that 2 g of the 5% PVA aqueous solution used in Example 49 was changed to 2 g of a 5% Nylon 6 formic acid solution.

Comparative Example 5

Two grams of tungsten oxide ($WO_3$) powder and 5 g of silicon oxide ($SiO_2$) powder were sufficiently mixed in an agate mortar so as to obtain an oxide mixture having 0.1 of the element ratio of the tungsten element to the silicon element.

Then, 1 g of the powdery oxide mixture was added to 2 g of a 5% PVA aqueous solution, and the resultant system was stirred at room temperature for 10 minutes so as to prepare a slurry. The slurry thus prepared was put in a petri dish formed of a PFA resin, and the slurry temperature was elevated stepwise to 60° C. and, then, to 150° C. under an air atmosphere so as to dry the slurry, thereby obtaining an electrolyte membrane having the weight ratio S/T of 0.9 and the thickness of 152 μm.

The electrolyte membrane obtained in each of Examples 49 to 86 was markedly swollen when water was added thereto so as to make it possible to peel off easily the electrolyte membrane from the petri dish formed of the PFA resin. Also, the electrolyte membrane obtained in each of Examples 49 to 86 was found to be flexible. Also, the electrolyte membrane obtained in each of Examples 49 to 86 was found to exhibit a solid super acidity when examined with an acidity indicator including m-nitro toluene (pKa=−11.99), p-nitro fluorobenzene (pKa=−12.40), p-nitro chlorobenzene (pKa=−12.70), m-nitro chlorobenzene (pKa=−13.16), 2,4-dinitro toluene (pKa=−13.75), 2,4-dinitro fluorobenzene (pKa=−14.52), and 1,3,5-trinitro benzene (pKa=−16.04). Where an oxide super acid is colored, it is difficult to evaluate the solid acidity from the change in color of the acidity indicator. In such a case, it is possible to measure the solid super acidity by employing a temperature programmed desorption method (TPD method) using ammonia. The details of the TPD method are as described previously. Tables 5 and 6 show the acidity function $H_0$ of Hammett for each of the electrolyte membranes.

On the other hand, the electrolyte membrane for Comparative Example 5 required more water for the swelling than the electrolyte membrane for each of Examples 49 to 86. Also, the electrolyte membrane for Comparative Example 5 did not exhibit a solid super acidity.

A liquid fuel cell was assembled as in Example 1 by using the electrolyte membrane for each of Examples 49 to 86 and Comparative Example 5.

A 20% methanol aqueous solution was introduced by utilizing the capillary action into the side surface of the fuel permeating section 7, as shown in FIG. 2. On the other hand, the air of 1 atm used as an oxidizing agent gas was circulated into the gas channel 9 at the flow rate of 100 mL/min so as to carry out the power generation. The carbon dioxide gas ($CO_2$) accompanying the power generating reaction was released to the outside through the fuel evaporating section 6. Tables 5 and 6 shows the maximum power generation amount for each of Examples 49 to 86 and Comparative Example 5.

Tables 5 and 6 also the results of the measurement of the methanol permeability and the membrane resistance for each of the electrolyte membranes. Each of the methanol permeability and the membrane resistance is given in Tables 5 and 6 by relative values, with the value of the NAFION 117 membrane for Comparative Example 1 set as 1. Incidentally, each of the methanol permeability and the membrane resistance was measured as described previously in conjunction with Example 1.

TABLE 5

| | Element X of oxide B | Oxide A containing element Y | Element ratio (X/Y) | Acidity function $H_0$ | Organic polymer material | Equilibrium moisture absorption rate (%) | Relative methanol permeability | Relative membrane resistance | Maximum power generation amount during use of 20% methanol (mW/cm$^2$) |
|---|---|---|---|---|---|---|---|---|---|
| Example 49 | B  | $Ga_2O_3$ | 0.1 | −11.99 | PVA | 25 | 0.78 | 0.82 | 16.1 |
| Example 50 | V  | $Ga_2O_3$ | 0.1 | −11.99 | PVA | 25 | 0.76 | 0.80 | 16.4 |
| Example 51 | Cr | $Ga_2O_3$ | 0.1 | −11.99 | PVA | 25 | 0.74 | 0.79 | 17.2 |
| Example 52 | Mo | $Ga_2O_3$ | 0.1 | −12.40 | PVA | 25 | 0.73 | 0.77 | 17.7 |
| Example 53 | W  | $Ga_2O_3$ | 0.1 | −12.40 | PVA | 25 | 0.71 | 0.75 | 18.5 |
| Example 54 | B  | $In_2O_3$ | 0.1 | −12.40 | PVA | 25 | 0.70 | 0.74 | 18.9 |
| Example 55 | V  | $In_2O_3$ | 0.1 | −12.40 | PVA | 25 | 0.68 | 0.72 | 19.1 |
| Example 56 | Cr | $In_2O_3$ | 0.1 | −12.40 | PVA | 25 | 0.67 | 0.70 | 20.5 |
| Example 57 | Mo | $In_2O_3$ | 0.1 | −12.70 | PVA | 25 | 0.66 | 0.69 | 21.2 |
| Example 58 | W  | $In_2O_3$ | 0.1 | −12.70 | PVA | 25 | 0.65 | 0.68 | 21.7 |
| Example 59 | B  | $GeO_2$   | 0.1 | −12.70 | PVA | 25 | 0.62 | 0.65 | 22.4 |
| Example 60 | V  | $GeO_2$   | 0.1 | −12.70 | PVA | 25 | 0.61 | 0.64 | 23.3 |
| Example 61 | Cr | $GeO_2$   | 0.1 | −12.70 | PVA | 25 | 0.59 | 0.62 | 23.6 |
| Example 62 | Mo | $GeO_2$   | 0.1 | −13.16 | PVA | 25 | 0.58 | 0.61 | 24.4 |
| Example 63 | W  | $GeO_2$   | 0.1 | −13.16 | PVA | 25 | 0.56 | 0.59 | 24.9 |
| Example 64 | B  | $Nb_2O_5$ | 0.1 | −13.16 | PVA | 25 | 0.54 | 0.58 | 25.5 |
| Example 65 | V  | $Nb_2O_5$ | 0.1 | −13.16 | PVA | 25 | 0.53 | 0.55 | 25.8 |
| Example 66 | Cr | $Nb_2O_5$ | 0.1 | −13.16 | PVA | 25 | 0.52 | 0.54 | 26.4 |
| Example 67 | Mo | $Nb_2O_5$ | 0.1 | −13.75 | PVA | 25 | 0.51 | 0.53 | 26.9 |
| Example 68 | W  | $Nb_2O_5$ | 0.1 | −13.75 | PVA | 25 | 0.49 | 0.52 | 27.8 |

TABLE 6

| | Element X of oxide B | Oxide A containing element Y | Element ratio (X/Y) | Acidity function $H_0$ | Organic polymer material | Equilibrium moisture absorption rate (%) | Relative methanol permeability | Relative membrane resistance | Maximum power generation amount during use of 20% methanol (mW/cm$^2$) |
|---|---|---|---|---|---|---|---|---|---|
| Example 69 | B  | $HfO_2$   | 0.1 | −13.75 | PVA | 25 | 0.48 | 0.51 | 29.1 |
| Example 70 | V  | $HfO_2$   | 0.1 | −13.75 | PVA | 25 | 0.45 | 0.48 | 30.4 |
| Example 71 | Cr | $HfO_2$   | 0.1 | −13.75 | PVA | 25 | 0.44 | 0.47 | 31.5 |
| Example 72 | Mo | $HfO_2$   | 0.1 | −14.52 | PVA | 25 | 0.42 | 0.45 | 32.6 |
| Example 73 | W  | $HfO_2$   | 0.1 | −14.52 | PVA | 25 | 0.40 | 0.44 | 33.3 |
| Example 74 | B  | $CeO_2$   | 0.1 | −14.52 | PVA | 25 | 0.38 | 0.41 | 33.4 |
| Example 75 | V  | $CeO_2$   | 0.1 | −14.52 | PVA | 25 | 0.34 | 0.37 | 33.8 |
| Example 76 | Cr | $CeO_2$   | 0.1 | −14.52 | PVA | 25 | 0.33 | 0.35 | 34.2 |
| Example 77 | Mo | $CeO_2$   | 0.1 | −15.00 | PVA | 25 | 0.31 | 0.35 | 34.4 |
| Example 78 | W  | $CeO_2$   | 0.1 | −15.00 | PVA | 25 | 0.30 | 0.33 | 35.2 |
| Example 79 | B  | $SnO_2$   | 0.1 | −15.00 | PVA | 25 | 0.29 | 0.31 | 35.4 |
| Example 80 | V  | $SnO_2$   | 0.1 | −15.00 | PVA | 25 | 0.27 | 0.29 | 35.9 |
| Example 81 | Cr | $SnO_2$   | 0.1 | −15.00 | PVA | 25 | 0.24 | 0.28 | 37.3 |
| Example 82 | Mo | $SnO_2$   | 0.1 | −16.04 | PVA | 25 | 0.23 | 0.25 | 38.8 |
| Example 83 | W  | $SnO_2$   | 0.1 | −16.04 | PVA | 25 | 0.22 | 0.24 | 39.4 |
| Example 84 | V  | $Nb_2O_5$ | 0.1 | −13.16 | PVA · PA | 32 | 0.63 | 0.68 | 24.5 |
| Example 85 | V  | $Nb_2O_5$ | 0.1 | −13.16 | PEG | 20 | 0.45 | 0.80 | 21.3 |
| Example 86 | V  | $Nb_2O_5$ | 0.1 | −13.16 | Nylon6 | 10 | 0.40 | 0.85 | 18.8 |
| Comparative Example 1 | — | — | — | — | — | — | 1.0 | 1.0 | 2.0 |
| Comparative Example 5 | $WO_3$ | $SiO_2$ | — | — | PVA | 25 | 3.0 | 6.0 | 0.05 |

As apparent from Tables 5 and 6, the methanol permeability and the membrane resistance of the electrolyte membrane for each of Examples 49 to 86 were much lower than those of the electrolyte membrane for Comparative Examples 1 and 5. Examples 49 to 86 were found to be much superior, even if compared with Examples 1 to 37. It should be noted that a hydrophilic organic polymer containing at least one selected from the group consisting of a hydroxyl group, a carboxyl group, an ether bond and an amide bond is used in preparing the electrolyte membrane for each of Examples 49 to 86 so as to make excellent the electrolyte membrane for each of these Examples. Also, the organic polymer material used for preparing the electrolyte membrane was changed in each of Examples 65 and 84 to 86 so as to change the equilibrium moisture absorption rate and, thus, to change the wettability between the inorganic material and the organic material, the dispersion capability of the inorganic material, and the water absorption capability of the electrolyte membrane. As a result, the fine structure of the electrolyte membrane was changed so as to change the proton conductivity and the methanol permeability of the electrolyte membrane. To be more specific, the electric resistance of the electrolyte membrane was diminished with increase in the equilibrium moisture absorption rate from 10% to 20% and, further, to 25%. Also, the methanol permeability was found to be diminished with decrease in the equilibrium moisture absorption rate.

As apparent from the experimental data for Comparative Example 1 given in Table 6, the cross-over and the membrane resistance were large in the case of using a 20% methanol aqueous solution in the fuel cell comprising a NAFION 117 membrane as the electrolyte membrane. The maximum power generation amount in this case was found to be only 2.0 mW/cm².

In Comparative Example 5, the fuel cell was prepared by using an electrolyte membrane, in which an oxide mixture consisting of tungsten oxide and silicon oxide was used as a proton conductor. As apparent from Table 6, the oxide mixture did not perform the proton conducting function in the fuel cell for Comparative Example 5, with the result that the electric membrane resistance was markedly increased so as to make it substantially impossible to carry out the power generation.

On the other hand, the cross-over was suppressed in the fuel cell comprising the proton conductive film for each of Examples 49 to 86 as the electrolyte membrane so as to make it possible to obtain a satisfactory power generation amount. The power generation was found to be large in the fuel cell for each of Examples 79 to 83, in which $SnO_2$ was used as the oxide carrier. The power generation amount was particularly large in the fuel cell for Example 83, in which the tungsten oxide particles were supported by the $SnO_2$ carrier.

The stability with time in the cell performance was observed in respect of the unit cell prepared by using the proton conductive membrane for each of Examples 49 to 86 as the electrolyte membrane. In this case, a 20% methanol aqueous solution was supplied to the unit cell as the fuel, and air was supplied as the oxidizing agent gas to the unit cell. Under these conditions, the both surfaces of the unit cell were heated to 40° C. so as to output a current of 10 mA/cm². The output was found to be stable even several hours later. Further, a similar measurement was performed at 150° C., with the result that the output was found to be stable even several hours later.

Example 87

An electrolyte membrane having the weight ratio S/T of 0.9 and a thickness of 152 μm was obtained as in Example 49, except that a proton conductive inorganic material manufactured as in Example 38 was used for preparing the electrolyte membrane.

Example 88

An electrolyte membrane having the weight ratio S/T of 0.9 and a thickness of 152 μm was obtained as in Example 49, except that a proton conductive inorganic material manufactured as in Example 39 was used for preparing the electrolyte membrane.

Example 89

An electrolyte membrane having the weight ratio S/T of 0.9 and a thickness of 154 μm was obtained as in Example 49, except that a proton conductive inorganic material manufactured as in Example 40 was used for preparing the electrolyte membrane.

Example 90

An electrolyte membrane having the weight ratio S/T of 0.9 and a thickness of 151 μm was obtained as in Example 49, except that a proton conductive inorganic material manufactured as in Example 41 was used for preparing the electrolyte membrane.

Example 91

An electrolyte membrane having the weight ratio S/T of 0.9 and a thickness of 152 μm was obtained as in Example 49, except that a proton conductive inorganic material manufactured as in Example 42 was used for preparing the electrolyte membrane.

Example 92

An electrolyte membrane having the weight ratio S/T of 0.9 and a thickness of 155 μm was obtained as in Example 49, except that a proton conductive inorganic material manufactured as in Example 43 was used for preparing the electrolyte membrane.

Example 93

An electrolyte membrane having the weight ratio S/T of 0.9 and a thickness of 150 μm was obtained as in Example 49, except that a proton conductive inorganic material manufactured as in Example 44 was used for preparing the electrolyte membrane.

Example 94

An electrolyte membrane having the weight ratio S/T of 0.9 and a thickness of 155 μm was obtained as in Example 49, except that a proton conductive inorganic material manufactured as in Example 45 was used for preparing the electrolyte membrane.

Example 95

An electrolyte membrane having the weight ratio S/T of 0.9 and a thickness of 152 μm was obtained as in Example 49, except that a proton conductive inorganic material manufactured as in Example 46 was used for preparing the electrolyte membrane.

Comparative Example 6

An electrolyte membrane having the weight ratio S/T of 0.9 and a thickness of 151 μm was obtained as in Example 49, except that a proton conductive inorganic material powder manufactured as in Comparative Example 3 was used for preparing the electrolyte membrane.

A liquid fuel cell was manufactured as in Example 49 by using the electrolyte membrane obtained in each of Examples 87 to 95 and Comparative Example 6. The maximum power generation amount of each of the fuel cells thus manufactured was measured, with the result as shown in Table 7.

TABLE 7

| | Element X of oxide B | Oxide A containing element Y | Oxide C containing element Z and used as an additive | Element ratio (X/Y) | Element ratio (Z/X + Y + Z) | Acidity function $H_0$ | Organic polymer material | Relative methanol permeability | Relative membrane resistance | Maximum power generation amount during use of 20% methanol (mW/cm$^2$) |
|---|---|---|---|---|---|---|---|---|---|---|
| Example 87 | Mo | ZrO$_2$ | MgO | 0.1 | 0.1 (10 mol %) | −13.75 | PVA | 0.33 | 0.40 | 43.2 |
| Example 88 | Mo | ZrO$_2$ | CaO | 0.1 | 0.1 (10 mol %) | −13.75 | PVA | 0.32 | 0.41 | 42.1 |
| Example 89 | Mo | ZrO$_2$ | SrO | 0.1 | 0.1 (10 mol %) | −13.75 | PVA | 0.33 | 0.42 | 43.3 |
| Example 90 | Mo | ZrO$_2$ | BaO | 0.1 | 0.1 (10 mol %) | −13.75 | PVA | 0.32 | 0.41 | 42.2 |
| Example 91 | Mo | ZrO$_2$ | SC$_2$O$_3$ | 0.1 | 0.14 (14 mol %) | −13.16 | PVA | 0.33 | 0.43 | 43.5 |
| Example 92 | Mo | ZrO$_2$ | Y$_2$O$_3$ | 0.1 | 0.14 (14 mol %) | −13.16 | PVA | 0.33 | 0.43 | 42.6 |
| Example 93 | Mo | ZrO$_2$ | La$_2$O$_3$ | 0.1 | 0.14 (14 mol %) | −13.16 | PVA | 0.33 | 0.43 | 42.2 |
| Example 94 | Mo | CeO$_2$ | Sm$_2$O$_3$ | 0.1 | 0.17 (17 mol %) | −13.75 | PVA | 0.30 | 0.42 | 43.1 |
| Example 95 | Mo | CeO$_2$ | Gd$_2$O$_3$ | 0.1 | 0.17 (17 mol %) | −13.75 | PVA | 0.31 | 0.43 | 43.0 |
| Comparative Example 6 | Mo | ZrO$_2$ | — | 0.08 | — | −14.52 | PVA | 0.33 | 0.66 | 29.0 |
| Comparative Example 9 | Mo | CeO$_2$ | — | 0.08 | — | −15.00 | PVA | 0.31 | 0.63 | 28.5 |

As shown in Table 7, the resistance of the electrolyte membrane for each of Examples 87 to 93 was found to be lower than that of the electrolyte membrane for Comparative Example 6. Also, the maximum power generation amount of the fuel cell for each of Examples 87 to 93 was found to be larger than that of the fuel cell for Comparative Example 6. The experimental data clearly support that the output characteristics of the fuel cell can be further improved by the addition of a third component of element Z.

In Comparative Example 6, the charging composition was controlled to permit the element ratio X/Y to be 0.1. However, the molybdenum oxide was sublimed from the oxide carrier during the baking stage at 850° C., with the result that the element ratio X/Y was lowered to 0.08. It is considered reasonable to understand that, since the proton conduction sites of the proton conductive inorganic material was decreased in Comparative Example 6, the electric membrane resistance was increased so as to lower the power generation amount. It is also considered reasonable to understand that the proton conduction sites of the proton conductive inorganic material were decreased in Comparative Example 6 because the bonding strength between the oxide particles and the oxide carrier was insufficient, though the reason for the difficulty has not yet been clarified sufficiently.

On the other hand, the molybdenum oxide particles were not scattered and not released from the oxide carrier in each of Examples 87 to 95, in which the third component was added for preparing the proton conductive inorganic material, so as to obtain the desired composition. It is considered reasonable to understand that the desired composition was obtained because the third component made it possible for the oxide particles to be bonded sufficiently to the oxide carrier. It should also be noted that the acidity of the proton conductive inorganic material was lowered by the addition of the basic oxide. However, since the addition of the basic oxide served to increase the proton conduction sites, the electric membrane resistance was lowered so as to increase the power generation amount.

Even in the case where the kind of element Y was changed to Ce, the electrolyte membrane for Examples 94 and 95 having the element Z added thereto made it possible to increase the maximum power generation amount of the fuel cell, compared with the electrolyte membrane for Example 77 having the element Z not added thereto. The experimental data support that the addition of the element Z permits improving the output characteristics of the fuel cell.

Example 96

A slurry was prepared by mixing the proton conductive inorganic material obtained in Example 49, a supported platinum/ruthenium catalyst, PVA and water in a mixing ratio by weight of 0.45/0.45/0.1/5.0, followed by coating a carbon cloth sized at 32 mm×32 mm with the slurry thus prepared so as to obtain a fuel electrode containing 4 mg/cm$^2$ of the Pt—Ru catalyst.

Also, a slurry was prepared by mixing the proton conductive inorganic material obtained in Example 49, a supported platinum catalyst, PVA and water in a mixing ratio by weight of 0.45/0.45/0.1/5.0, followed by coating a carbon cloth sized at 32 mm×32 mm with the slurry thus prepared so as to obtain an oxidizing agent electrode containing 4 mg/cm$^2$ of the Pt catalyst.

Further, prepared as an electrolyte membrane was a NAFION 117 membrane similar to that used in Comparative Example 1.

A fuel cell was manufactured as in Example 49, except that the fuel electrode, the oxidizing agent electrode and the electrolyte membrane noted above were used for manufacturing the fuel cell.

Example 97

A fuel cell was manufactured as in Example 49, except that the fuel electrode and the oxidizing agent electrode obtained in Example 96 and the electrolyte membrane obtained in Example 49 were used for manufacturing the fuel cell.

Comparative Example 7

A platinum/ruthenium catalyst was supported by the proton conductive inorganic material obtained in Example 49. A slurry was prepared by mixing the proton conductive inorganic material supporting the Pt—Ru catalyst thus obtained, carbon, PVA and water in a mixing ratio by weight of 0.45/0.45/0.1/5.0, followed by coating a carbon cloth sized at 32 mm×32 mm with the slurry thus prepared so as to obtain a fuel electrode supporting 4 mg/cm$^2$ of the Pt—Ru catalyst.

Also, a platinum catalyst was supported by the proton conductive inorganic material obtained in Example 49. A slurry was prepared by mixing the proton conductive inorganic material supporting the platinum catalyst thus prepared, carbon, PVA and water in a mixing ratio by weight of 0.45/0.45/0.1/5.0, followed by coating a carbon cloth sized at 32 mm×32 mm with the slurry thus prepared so as to obtain an oxidizing agent electrode containing 4 mg/cm$^2$ of the Pt catalyst.

Further, prepared as an electrolyte membrane was a NAFION 117 membrane similar to that used in Comparative Example 1.

A fuel cell was manufactured as in Example 49, except that the fuel electrode, the oxidizing agent electrode and the electrolyte membrane noted above were used for manufacturing the fuel cell.

The cell resistance and the maximum power generation amount were measured in respect of the fuel cell manufactured in each of Examples 96, 97, with the result as shown in Table 8. Incidentally, the experimental data for each of Example 49 and Comparative Example 1 are also shown in Table 8.

TABLE 8

| | Fuel electrode | Electrolyte membrane | Oxidizing agent electrode | Cell resistance (mΩ) | Maximum power generation amount during use of 20% methanol (mW/cm$^2$) |
|---|---|---|---|---|---|
| Example 49 | Organic polymer material containing perfluoro sulfonic acid | Proton conductive inorganic material | Organic polymer material containing perfluoro sulfonic acid | 20 | 16.1 |
| Example 96 | Proton conductive inorganic material | Organic polymer material containing perfluoro sulfonic acid | Proton conductive inorganic material | 23 | 14.2 |
| Example 97 | Proton conductive inorganic material | Proton conductive inorganic material | Proton conductive inorganic material | 14 | 32.1 |
| Comparative Example 1 | Organic polymer material containing perfluoro sulfonic acid | Organic polymer material containing perfluoro sulfonic acid | Organic polymer material containing perfluoro sulfonic acid | 30 | 2.0 |

As apparent from Table 8, the membrane electrode assembly obtained in each of Examples 49, 96 and 97 was found to exhibit output characteristics superior to those exhibited by the membrane electrode assembly obtained in Comparative Example 1. It should be noted that the proton conductive inorganic material used in the Examples noted above for preparing the electrode or the electrolyte membrane was low in its electric resistance, leading to the low cell resistance, so as to have caused the membrane electrode assembly to exhibit the excellent output characteristics. It should also be noted that Examples 49 and 97 were found to be superior to Example 96 in the output characteristics. The output characteristics for Examples 49 and 97 were excellent because the electrolyte membrane obtained in Example 49 was low in its methanol permeability as shown in Table 5.

Also, in Comparative Example 7, a Pt—Ru catalyst or a Pt catalyst was supported by a proton conductive inorganic material so as to prepare the electrode. In this case, the power generation amount of the fuel cell was very small. It is considered reasonable to understand that the catalyst supported by the proton conductive inorganic material was incapable of acquiring a sufficient electric conductivity so as to increase the electric resistance and, thus, the fuel cell was substantially incapable of generating an electric power.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrolyte membrane which comprises a proton conductive inorganic material and a polymer material, and which has a solid super acidity in which an acidity function $H_0$ of Hammett satisfies $H_0 < -11.93$, wherein the proton conductive inorganic material comprises:

oxide particles comprising at least one element X selected from the group consisting of W, Mo, Cr, B and V; and an oxide carrier comprising at least one first element selected from the group consisting of Sn, Hf, Ge, Ga, In, Ce and Nb, wherein the oxide particles are supported on the oxide carrier.

2. The electrolyte membrane according to claim 1, wherein at least one of the oxide particles and the oxide carrier further comprises at least one element Z selected from the group consisting of Y, Sc, La, Sm, Gd, Mg, Ca, Sr and Ba.

3. The electrolyte membrane according to claim 2, wherein a molar amount of the element Z falls within a range of 0.01 to 40 mol % on the basis that a total molar amount of the element X, the first element and the element Z is set at 100%.

4. The electrolyte membrane according to claim 1, wherein the proton conductive inorganic material has a specific surface area falling within a range of 10 $m^2/g$ to 2,000 $m^2/g$, and an element ratio of the element X to the first element falls within a range of 0.0001 to 20.

5. The electrolyte membrane according to claim 1, wherein the polymer material comprises a hydrophilic organic polymer having at least one selected from the group consisting of a hydroxyl group, a carboxyl group, an ether bond and an amide bond.

6. An electrode, comprising:
a proton conductive inorganic material comprising:
oxide particles comprising at least one element X selected from the group consisting of W, Mo, Cr, B and V, and an oxide carrier comprising at least one first element selected from the group consisting of Sn, Hf, Ge, Ga, In, Ce and Nb, and wherein the proton conductive inorganic material has a solid super acidity in which an acidity function $H_0$ of Hammett satisfies $H_0<-11.93$;
a polymer material; and
a redox catalyst,
wherein the oxide particles are supported on the oxide carrier.

7. The electrode according to claim 6, wherein at least one of the oxide particles and the oxide carrier comprises at least one element Z selected from the group consisting of Y, Sc, La, Sm, Gd, Mg, Ca, Sr and Ba.

8. The electrode according to claim 7, wherein a molar amount of the element Z falls within a range of 0.01 to 40 mol % on the basis that a total molar amount of the element X, the first element and the element Z is set at 100%.

9. The electrode according to claim 6, wherein the proton conductive inorganic material has a specific surface area falling within a range of 10 $m^2/g$ to 2,000 $m^2/g$, and an element ratio of the element X to the first element falls within a range of 0.0001 to 20.

10. The electrode according to claim 6, wherein the polymer material comprises a hydrophilic organic polymer having at least one selected from the group consisting of a hydroxyl group, a carboxyl group, an ether bond and an amide bond.

11. A membrane electrode assembly comprising a fuel electrode, an oxidizing agent electrode, and an electrolyte membrane provided between the fuel electrode and the oxidizing agent electrode,
wherein at least one of the fuel electrode, the oxidizing agent electrode, and the electrolyte membrane comprises a proton conductive inorganic material comprising oxide particles containing at least one element X selected from the group consisting of W, Mo, Cr, B and V, and an oxide carrier comprising at least one first element selected from the group consisting of Sn, Hf, Ge, Ga, In, Ce and Nb, and the proton conductive inorganic material has a solid super acidity in which an acidity function $H_0$ of Hammett satisfies $H_0<-11.93$,
wherein the oxide particles are supported on the oxide carrier.

12. A fuel cell comprising a fuel electrode, an oxidizing agent electrode, and an electrolyte membrane provided between the fuel electrode and the oxidizing agent electrode,
wherein at least one of the fuel electrode, the oxidizing agent electrode, and the electrolyte membrane comprises a proton conductive inorganic material including oxide particles comprising at least one element X selected from the group consisting of W, Mo, Cr, B and V, and an oxide carrier comprising at least one first element selected from the group consisting of Sn, Hf, Ge, Ga, In, Ce and Nb, and the proton conductive inorganic material has a solid super acidity in which an acidity function $H_0$ of Hammett satisfies $H_0<-11.93$,
wherein the oxide particles are supported on the oxide carrier.

13. A proton conductive inorganic material, comprising:
oxide particles comprising at least one element X selected from the group consisting of W, Mo, Cr, B and V; and
an oxide carrier comprising at least one first element selected from the group consisting of Sn, Hf, Ge, Ga, In, Ce and Nb, and the proton conductive inorganic material has a solid super acidity in which an acidity function $H_0$ of Hammett satisfies $H_0<-11.93$,
wherein the oxide particles are supported on the oxide carrier.

14. The electrolyte membrane according to claim 1, wherein the proton conductive inorganic material has a Lewis acid point.

15. The electrode according to claim 6, wherein the proton conductive inorganic material has a Lewis acid point.

16. The membrane electrode assembly according to claim 11, wherein the proton conductive inorganic material has a Lewis acid point.

17. The fuel cell according to claim 12, wherein the proton conductive inorganic material has a Lewis acid point.

18. The electrolyte membrane according to claim 1, wherein the first element is at least one selected from the group consisting of Hf, Ge, Ga, In, Ce and Nb.

19. The electrode according to claim 6, wherein the first element is at least one selected from the group consisting of Hf, Ge, Ga, In, Ce and Nb.

20. The membrane electrode assembly according to claim 11, wherein the first element is at least one selected from the group consisting of Hf, Ge, Ga, In, Ce and Nb.

21. The fuel cell according to claim 12, wherein the first element is at least one selected from the group consisting of Hf, Ge, Ga, In, Ce and Nb.

22. The electrolyte membrane according to claim 1, wherein the proton conductive inorganic material consists essentially of the oxide particles and the oxide carrier.

23. The electrode according to claim 6, wherein the proton conductive inorganic material consists essentially of the oxide particles and the oxide carrier.

24. The membrane electrode assembly according to claim 11, wherein the proton conductive inorganic material consists essentially of the oxide particles and the oxide carrier.

25. The fuel cell according to claim 12, wherein the proton conductive inorganic material consists essentially of the oxide particles and the oxide carrier.

26. The proton conductive inorganic material according to claim 13 which consists essentially of the oxide particles and the oxide carrier.

* * * * *